U S009509993B2

United States Patent
Yokokawa et al.

(10) Patent No.: US 9,509,993 B2
(45) Date of Patent: Nov. 29, 2016

(54) IMAGE PROCESSING DEVICE AND METHOD, PROGRAM, AND RECORDING MEDIUM

(71) Applicant: Sony Corporation, Tokyo (JP)

(72) Inventors: Masatoshi Yokokawa, Kanagawa (JP); Takefumi Nagumo, Kanagawa (JP); Jun Luo, Tokyo (JP)

(73) Assignee: Sony Corporation, Tokyo (JP)

( * ) Notice: Subject to any disclaimer, the term of this patent is extended or adjusted under 35 U.S.C. 154(b) by 275 days.

(21) Appl. No.: 14/343,062

(22) PCT Filed: Oct. 5, 2012

(86) PCT No.: PCT/JP2012/075921
§ 371 (c)(1),
(2) Date: Mar. 6, 2014

(87) PCT Pub. No.: WO2013/054750
PCT Pub. Date: Apr. 18, 2013

(65) Prior Publication Data
US 2014/0226726 A1    Aug. 14, 2014

(30) Foreign Application Priority Data
Oct. 14, 2011    (JP) .................................. 2011-226703

(51) Int. Cl.
*H04N 19/00* (2014.01)
*H04N 19/117* (2014.01)
(Continued)

(52) U.S. Cl.
CPC ...... *H04N 19/00642* (2013.01); *H04N 19/117* (2014.11); *H04N 19/136* (2014.11);
(Continued)

(58) Field of Classification Search
None
See application file for complete search history.

(56) References Cited

U.S. PATENT DOCUMENTS

| 5,974,197 | A | * | 10/1999 | Lee | ........................... G06T 5/20 382/199 |
| 6,041,145 | A | * | 3/2000 | Hayashi | ................. H04N 19/61 375/E7.19 |
| 2007/0140355 | A1 | * | 6/2007 | Uchida | .................. H04N 19/61 375/240.24 |

(Continued)

FOREIGN PATENT DOCUMENTS

| JP | 2003-209811 A | 7/2003 |
| JP | 2007-312370 A | 11/2007 |

OTHER PUBLICATIONS

No Author Listed, Series H: Audiovisual and Multimedia Systems, Infrastructure of audiovisual services—Coding of moving video, Advanced video coding for generic audiovisual services, International Telecommunication Union, Recommendation ITU-T H.264, (Mar. 2010), 676p (see section 8.7 Deblocking filter process).

*Primary Examiner* — Reza Aghevli
(74) *Attorney, Agent, or Firm* — Wolf, Greenfield & Sacks, P.C.

(57) ABSTRACT

An image processing device includes a motion predicting unit that detects, from a criteria image and a reference image, the motion vector of each of blocks constituting an image, a motion compensating unit that generates a motion-compensated image by performing motion compensation on the reference image, using the motion vectors, a correction value calculating unit that calculates a correction value for correcting the pixel value of a current pixel in a current block in the motion-compensated image based on a boundary difference value between the criteria image and the motion-compensated image, and an adding unit that adds the correction value to the pixel value of the current pixel in the motion-compensated image.

6 Claims, 19 Drawing Sheets

(51) Int. Cl.
  *H04N 19/136* (2014.01)
  *H04N 19/167* (2014.01)
  *H04N 19/82* (2014.01)
  *H04N 19/55* (2014.01)
  *H04N 19/51* (2014.01)
  *H04N 19/182* (2014.01)
  *H04N 19/86* (2014.01)

(52) U.S. Cl.
  CPC .......... *H04N19/167* (2014.11); *H04N 19/182* (2014.11); *H04N 19/51* (2014.11); *H04N 19/82* (2014.11); *H04N 19/86* (2014.11)

(56) References Cited

U.S. PATENT DOCUMENTS

| | | | | |
|---|---|---|---|---|
| 2007/0242896 | A1* | 10/2007 | Okumichi | H04N 19/176 382/268 |
| 2008/0317377 | A1* | 12/2008 | Saigo | H04N 9/045 382/274 |
| 2010/0245672 | A1* | 9/2010 | Erdler | H04N 19/139 348/608 |
| 2011/0206135 | A1* | 8/2011 | Drugeon | H04N 19/176 375/240.24 |
| 2011/0228843 | A1* | 9/2011 | Narroschke | H04N 19/46 375/240.03 |

* cited by examiner

IMAGE PROCESSING DEVICE AND METHOD, PROGRAM, AND RECORDING MEDIUM

TECHNICAL FIELD

The present technique relates to image processing devices, image processing methods, programs, and recording media, and more particularly, to an image processing device, an image processing method, a program, and a recording medium that enable more accurate block noise correction without degradation of image quality.

BACKGROUND ART

In some cases, a block matching process performed with the use of a criteria image and a reference image on a block-by-block basis causes a difference in tone between blocks adjacent to each other. Such a difference in tone often occurs particularly in regions where tone changes slowly. Noise caused by such a difference in tone is called block noise.

Meanwhile, an apparatus that encodes images by MPEG-4 (Moving Picture Experts Group phase 4) or H.264/AVC (Advanced Video Coding) includes a deblocking filter that performs a deblocking process to remove block noise (see Non-Patent Document 1). Degradation of image quality can be reduced by smoothing the boundary portions of blocks through the deblocking process.

CITATION LIST

Non-Patent Document

Non-Patent Document 1: "8.7 Deblocking filter process", "ITU-T Recommendation H.264 Advanced video coding for generic audiovisual", March 2010, p. 197-202.

SUMMARY OF THE INVENTION

Problems to be Solved by the Invention

However, by the above described technique, there is a possibility that texture will be lost due to the deblocking process, and images will be blurred, resulting in poorer image quality.

Furthermore, block noise of certain intensity can be made inconspicuous by the above described filtering process. However, degradation of image quality cannot be reduced when high-intensity block noise is caused by low-precision block matching.

The present technique has been developed in view of those circumstances, and particularly aims to enable more accurate block noise correction without degradation of image quality.

Solutions to Problems

An image processing device of one aspect of the present technique includes: a motion predicting unit that detects, from a criteria image and a reference image, a motion vector of each block in an image; a motion compensating unit that generates a motion-compensated image by performing motion compensation on the reference image, using the motion vector; a correction value calculating unit that calculates a correction value for correcting the pixel value of a current pixel in a current block in the motion-compensated image based on a boundary difference value between the criteria image and the motion-compensated image, the boundary difference value being a difference value with respect to the pixel value of a boundary pixel in a boundary portion adjacent to an adjacent block in the current block; and an adding unit that adds the correction value to the pixel value of the current pixel in the motion-compensated image.

The correction value calculating unit may calculate the correction value for the current pixel based on the boundary difference value and a weight corresponding to a distance between the current pixel and the boundary pixel.

The correction value calculating unit may calculate the correction value for the current pixel based on the boundary difference value between the criteria image and the motion-compensated image, with respect to the boundary pixel from which a pixel in the boundary portion adjacent to the adjacent block in the current block is subtracted.

The image processing device may further include: an approximating unit that approximates a difference value with a predetermined function, the difference value being a difference between the pixel value of a pixel in the criteria image and the pixel value of a pixel in the motion-compensated image on a block-by-block basis; an integrating unit that integrates the predetermined function; a weight calculating unit that calculates a weight coefficient in accordance with the value of the integral obtained by the integrating unit and a distribution of noise intensity corresponding to an image luminance value; and a weighting unit that weights the correction value for the current pixel by using the weight coefficient, In this case, the adding unit adds the correction value weighted by the weighting unit to the pixel value of the current pixel in the motion-compensated image.

The image processing device may further include: an approximating unit that approximates a difference value with a predetermined function, the difference value being the difference between the pixel value of a pixel in the criteria image and the pixel value of a pixel in the motion-compensated image on a block-by-block basis; an integrating unit that integrates the predetermined function; and a combining unit that generates a combined image in accordance with the value of the integral obtained by the integrating unit and a distribution of noise intensity corresponding to an image luminance value, the combined image being formed by combining the pixel value of the pixel in the criteria image and the pixel value of the pixel in the motion-compensated image. In this case, the correction value calculating unit calculates the correction value for the current pixel in the current block based on the boundary difference value between the combined image and the motion-compensated image, the boundary difference value being the difference value with respect to the pixel value of the boundary pixel in the boundary portion adjacent to the adjacent block in the current block.

An image processing method implemented in an image processing device that includes: a motion predicting unit that detects, from a criteria image and a reference image, a motion vector of each block in an image; a motion compensating unit that generates a motion-compensated image by performing motion compensation on the reference image, using the motion vector; a correction value calculating unit that calculates a correction value for correcting the pixel value of a current pixel in a current block in the motion-compensated image based on a boundary difference value between the criteria image and the motion-compensated image, the boundary difference value being a difference value with respect to the pixel value of a boundary pixel in a boundary portion adjacent to an adjacent block in the current block; and an adding unit that adds the correction value to the pixel value of the current pixel in the motion-compensated image. This image processing method includes the steps of: generating a motion-compensated image by detecting, from a criteria image and a reference image, a motion vector of each block in an image, and performing motion compensation on the reference image, using the motion vector; calculating a correction value for correcting the pixel value of a current pixel in a current block in the motion-compensated image based on a boundary difference value between the criteria image and the motion-compensated image, the boundary difference value being a difference value with respect to the pixel value of a boundary pixel in a boundary portion adjacent to an adjacent block in the current block; and adding the correction value to the pixel value of the current pixel in the motion-compensated image, the steps being carried out by the image processing device.

A program of one aspect of the present technique and a program recorded in a recording medium of one aspect of the present technique cause a computer to perform a process including: a motion vector detecting step of detecting, from a criteria image and a reference image, a motion vector of each block in an image; a motion compensating step of generating a motion-compensated image by performing motion compensation on the reference image, using the motion vector; a correction value calculating step of calculating a correction value for correcting the pixel value of a current pixel in a current block in the motion-compensated image based on a boundary difference value between the criteria image and the motion-compensated image, the boundary difference value being a difference value with respect to the pixel value of a boundary pixel in a boundary portion adjacent to an adjacent block in the current block; and an adding step of adding the correction value to the pixel value of the current pixel in the motion-compensated image.

In one aspect of the present technique, the motion vectors of the blocks constituting an image are detected from a criteria image and a reference image, and a motion-compensated image is generated by performing motion compensation on the reference image using the motion vectors. The pixel value of a current pixel in a current block in the motion-compensated image is corrected based on a boundary difference value between the criteria image and the motion-compensated image, the boundary difference value being a difference value with respect to the pixel value of a boundary pixel in a boundary portion adjacent to an adjacent block in the current block. The correction value is added to the pixel value of the current pixel in the motion-compensated image.

Effects of the Invention

According to one aspect of the present technique, block noise can be more accurately corrected, without degradation of image quality.

MODES FOR CARRYING OUT THE INVENTION

Figure 1:
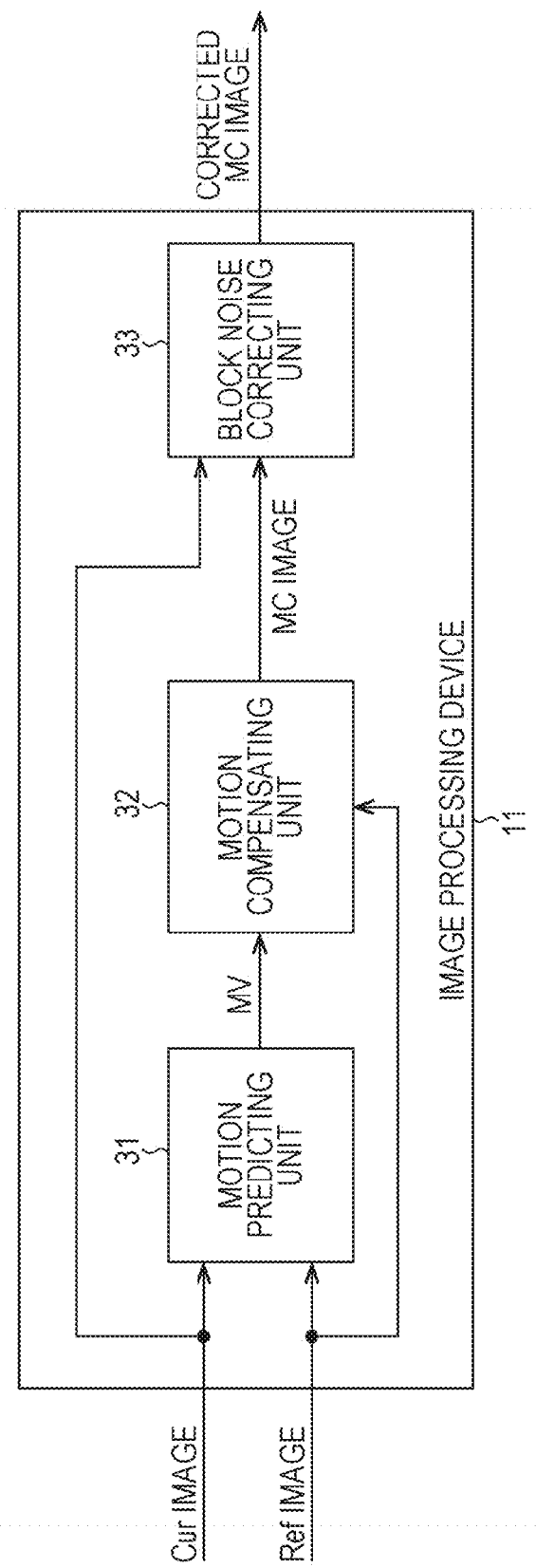
FIG. 1 is a block diagram showing an example functional structure of an embodiment of an image processing device to which the present technique is applied.

The following is a description of embodiments of the present technique, with reference to the drawings. Explanation will be made in the following order.

1. Example structure of an image processing device
2. Example structure of the block noise correcting unit
3. Block-noise-corrected MC image output process and block noise correction process
4. Example structure of an image processing device including a block noise detecting unit
5. Example structures of the block noise detecting unit and the block noise correcting unit
6. Other example structures of the block noise detecting unit and the block noise correcting unit <1. Example Structure of an Image Processing Device>

FIG. 1 shows an example structure of an embodiment of an image processing device to which the present technique is applied.

The image processing device 11 shown in FIG. 1 performs block matching by using a criteria image (hereinafter referred to as the Cur image) that is supplied (input) from an imaging apparatus (not shown) and a reference image (hereinafter referred to as the Ref image) that is older than the Cur image in terms of time, and generates a predicted image of the Cur image. Using the Cur image and the predicted image, the image processing device 11 corrects the block noise included in the predicted image, and outputs the resultant predicted image having the block noise corrected. An image that is input to the image processing device 11 is a moving image formed with frames that are sequential in terms of time, and the Ref image is a noise-reduced image formed by another image processing device performing a noise reduction process on a Cur image based on a predicted image having block noise corrected. The image processing device 11 may be installed into an imaging apparatus such as a digital camera.

The image processing device 11 shown in FIG. 1 includes a motion predicting unit 31, a motion compensating unit 32, and a block noise correcting unit 33.

The motion predicting unit 31 detects motion vectors MV from a Cur image as the current frame and a Ref image that is one frame before the Cur image, and supplies the motion vectors MV to the motion compensating unit 32. The motion vectors MV are of the blocks constituting those images. Specifically, the motion predicting unit 31 performs position matching between the blocks in the Cur image and the corresponding blocks in the Ref image, to detect the motion vectors MV of the blocks.

Using the motion vectors MV of the blocks supplied from the motion predicting unit 31, the motion compensating unit 32 performs motion compensation on the Ref image, to adjust the blocks in the Ref image to the blocks in the Cur image and generate a motion-compensated image (hereinafter referred to as the MC image). The motion-compensated image is supplied to the block noise correcting unit 33.

Based on the Cur image and the MC image supplied from the motion compensating unit 32, the block noise correcting unit 33 calculates a correction value for correcting the pixel values of the pixels in the MC image, and corrects the block noise included in the MC image. The result of the correction or the MC image having the block noise corrected (hereinafter referred to as the block-noise-corrected MC image or the corrected MC image) is output. Specifically, the block noise correcting unit 33 calculates difference values in pixel value between the pixels in the Cur image and the pixels in the MC image, and calculates the correction value based on the differences. In this manner, the block noise included in the MC image formed with blocks is corrected.

<2. Example Structure of the Block Noise Correcting Unit>

Figure 2:
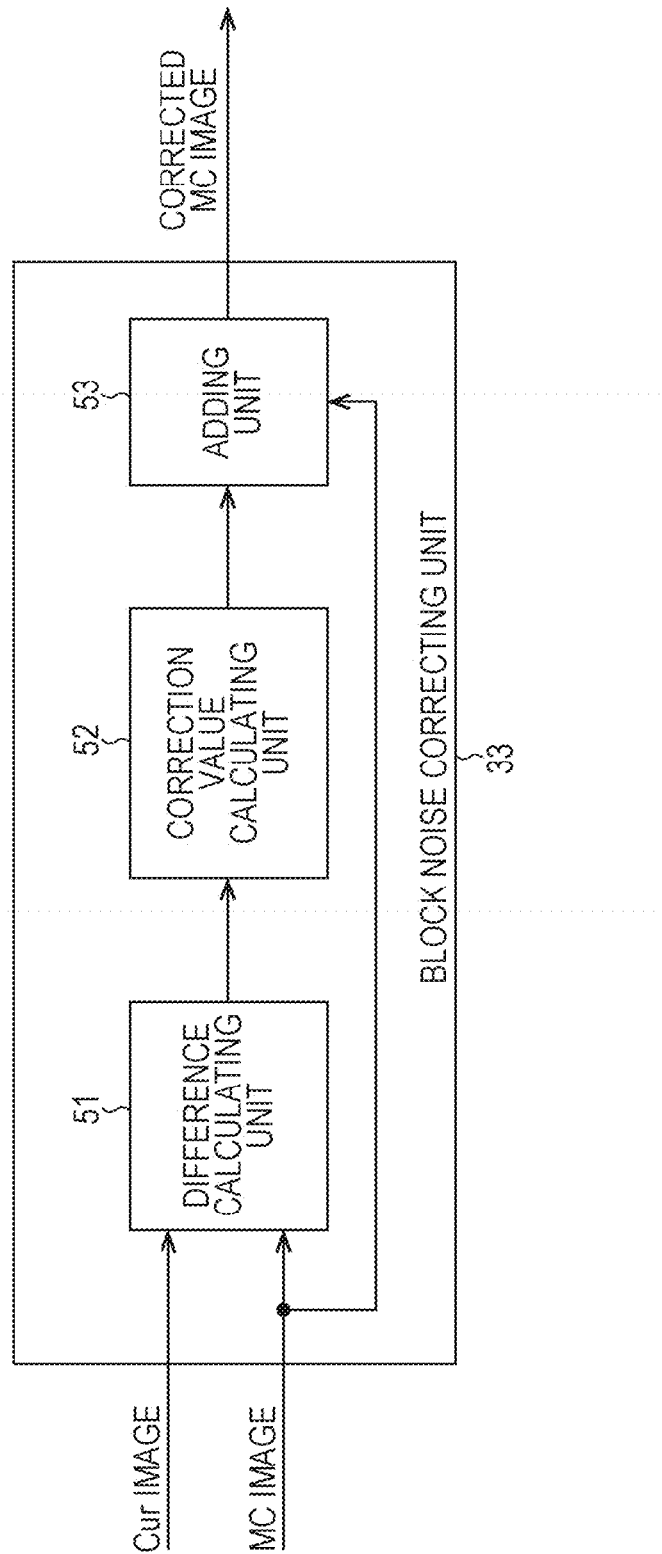
FIG. 2 is a block diagram showing an example structure of the block noise correcting unit.

Referring now to FIG. 2, an example structure of the block noise correcting unit 33 is described.

The block noise correcting unit 33 shown in FIG. 2 includes a difference calculating unit 51, a correction value calculating unit 52, and an adding unit 53.

The difference calculating unit 51 calculates the difference values between the pixel values of pixels in a Cur image and the pixel values of pixels in an MC image, and supplies the difference values to the correction value calculating unit 52. Specifically, with respect to the pixels (hereinafter also referred to as the boundary pixels) in the boundary portions adjacent to adjacent blocks of the current block, the difference calculating unit 51 calculates the difference values (hereinafter also referred to as the boundary difference values) between pixel values of the Cur image and pixel values of the MC image.

Based on the boundary difference value supplied from the difference calculating unit 51, the correction value calculating unit 52 calculates a correction value for correcting the pixel value of the current pixel in the current block in the MC image, and supplies the correction value to the adding unit 53.

The adding unit 53 adds the correction value for the current pixel supplied from the correction value calculating unit 52 to the pixel value of the current pixel in the MC image, to calculate the pixel value of the pixel corresponding to the current pixel in the corrected MC image. The correction value is added to all the pixels in the block in the MC image, and this addition process is performed on all the blocks in the MC image, to output the corrected MC image.

<3. Block-Noise-corrected MC Image Output Process and Block Noise Correction Process>

Figure 3:
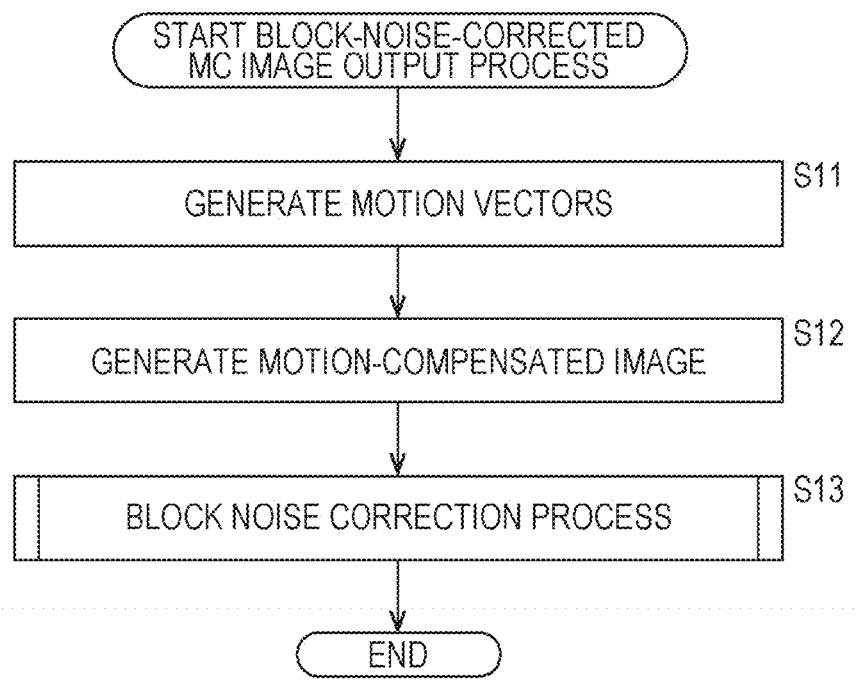
FIG. 3 is a flowchart for explaining a block-noise-corrected MC image output process.
Figure 4:
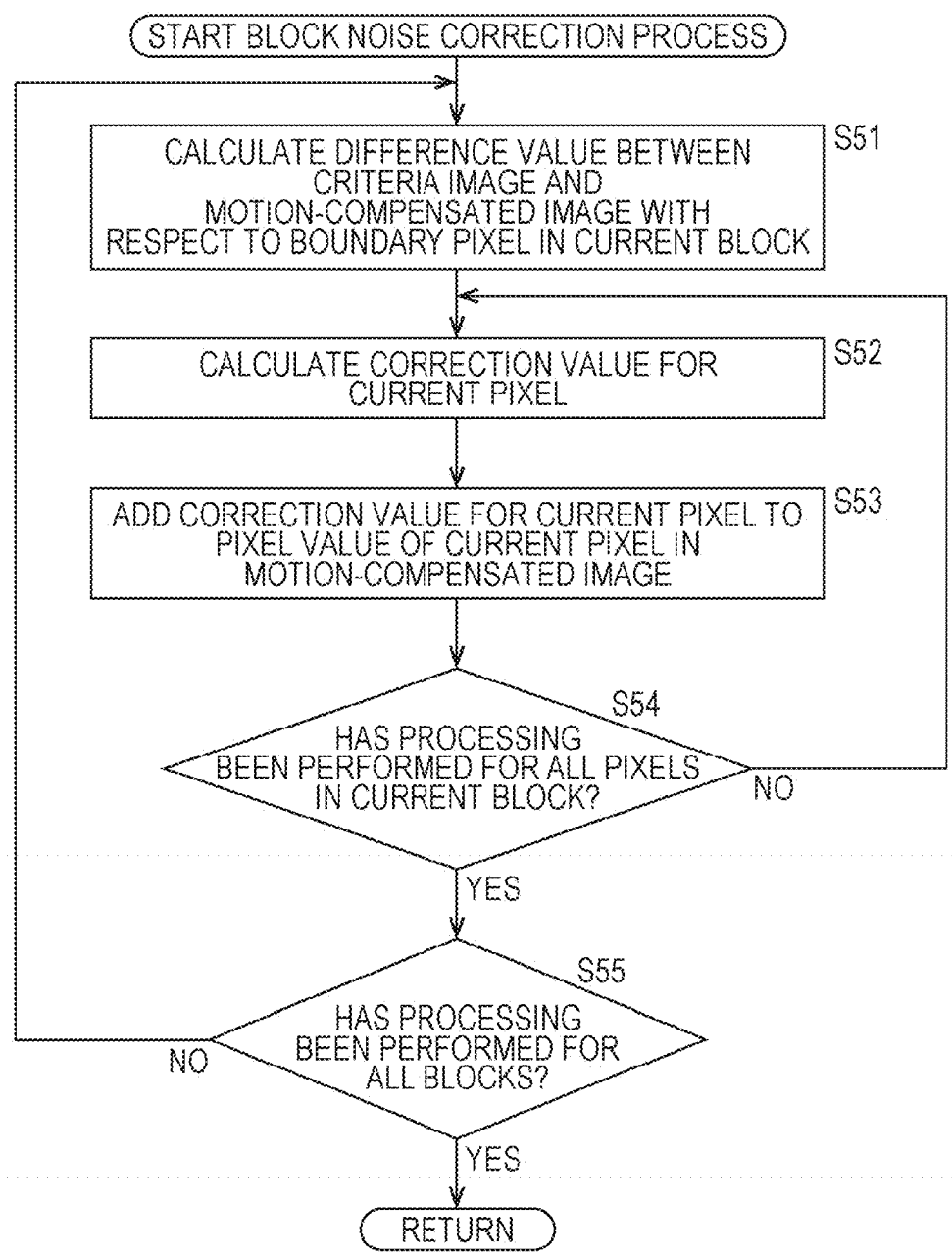
FIG. 4 is a flowchart for explaining a block noise correction process.

Referring now to the flowcharts shown in FIGS. 3 and 4, a block-noise-corrected MC image output process to be performed by the image processing device 11 shown in FIG. 1 and a block noise correction process to be performed by the block noise correcting unit 33 shown in FIG. 2 are described.

[Block-Noise-Corrected MC Image Output Process]

Referring first to the flowchart shown in FIG. 3, a block-noise-corrected MC image output process to be performed by the image processing device 11 shown in FIG. 1 is described.

In step S11, the motion predicting unit 31 detects the motion vector MV of each block from a Cur image and a Ref image, and supplies the motion vectors MV to the motion compensating unit 32.

In step S12, using the motion vectors MV supplied from the motion predicting unit 31, the motion compensating unit 32 performs motion compensation on the Ref image to generate a motion-compensated image (MC image), and supplies the MC image to the block noise correcting unit 33.

In step S13, the block noise correcting unit 33 performs a block noise correction process to correct the block noise included in the MC image, and outputs the corrected MC image as a result of the correction.

In the above manner, the corrected MC image having the block noise included in the MC image corrected is output.

[Block Noise Correction Process]

Referring now to the flowchart shown in FIG. 4, the block noise detection process in step S13 of the flowchart shown in FIG. 3 is described.

In step S51, with respect to the pixels (boundary pixels) in the boundary portions adjacent to the adjacent blocks of the current block, the difference calculating unit 51 calculates the difference values (boundary difference values) between pixel values of the Cur image and pixel values of the MC image.

Figure 5:
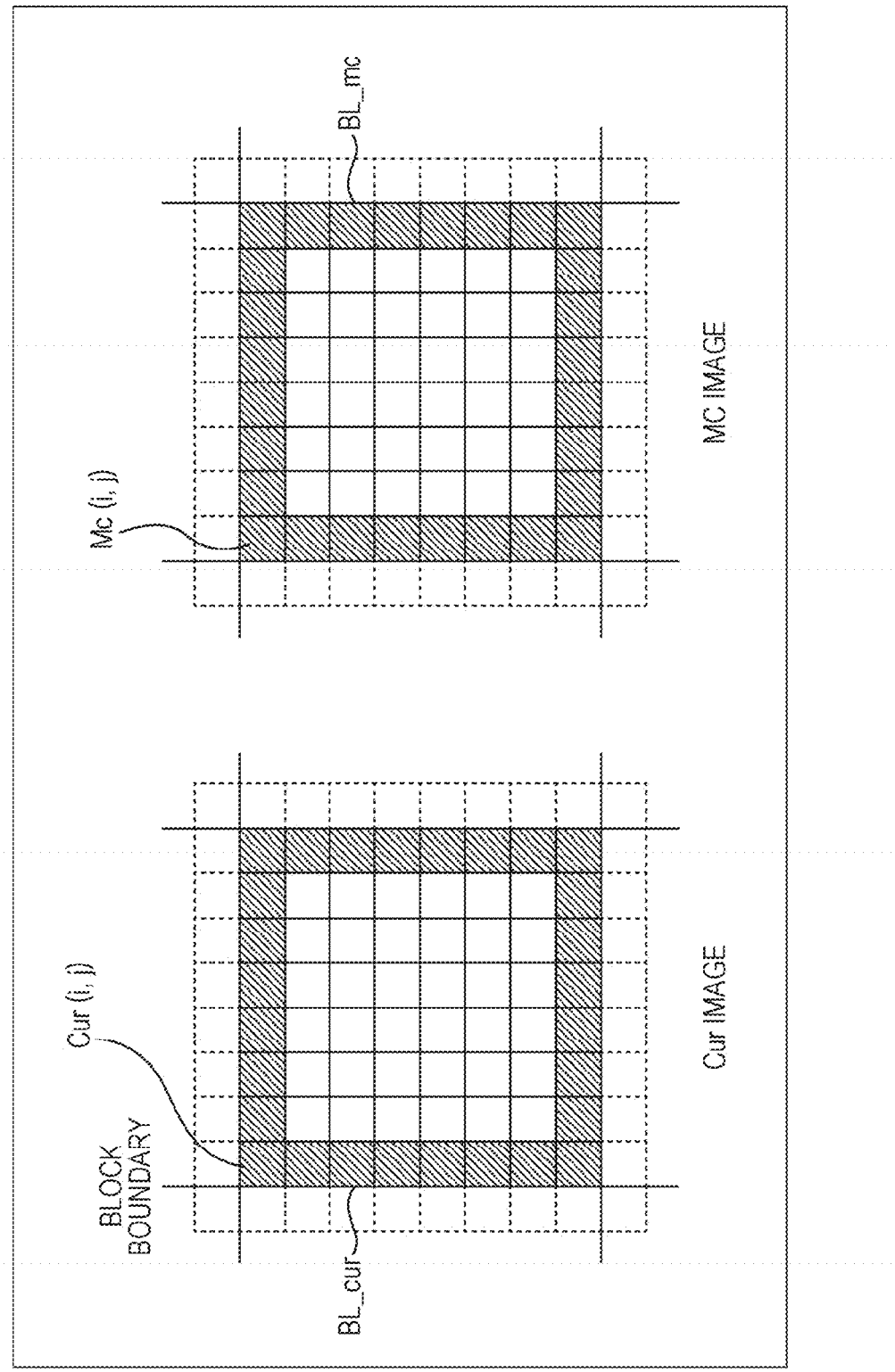
FIG. 5 is a diagram for explaining difference values with respect to pixels in boundary portions in a current block.

Referring now to FIG. 5, the difference values between pixels in the boundary portions of the current block is described.

The left half of FIG. 5 shows a current block BL_cur in the Cur image, and the right half of FIG. 5 shows a current block BL_mc in the MC image. In FIG. 5, each square in the current blocks BL_cur and BL_mc represents a pixel. That is, each of the current block BL_cur and BL_mc is formed with 8×8 pixels.

In the current blocks BL_cur and BL_mc, the pixel positions of the boundary pixels (the shaded pixels in the drawing) are represented by i and j. The difference value between the pixel value Cur (i, j) of a boundary pixel in the current block BL_cur and the pixel value Mc (i, j) of a boundary pixel in the current block BL_mc, or a boundary difference value $S(i, j)$, is expressed by the following equation (1).

[Mathematical Formula 1]

$$S(i,j) \text{Cur}(i,j) - Mc(i,j)$$

$$i,j \in \text{boundary} \quad (1)$$

In the equation (1), "boundary" represents the pixel position of a boundary pixel in the current block.

Referring back to the flowchart shown in FIG. 4, in step S52, the correction value calculating unit 52 calculates the correction value for the current pixel based on the boundary difference value supplied from the difference calculating unit 51 and weight information that indicates the weight corresponding to the distance between the current pixel and the boundary pixel.

Figure 6:
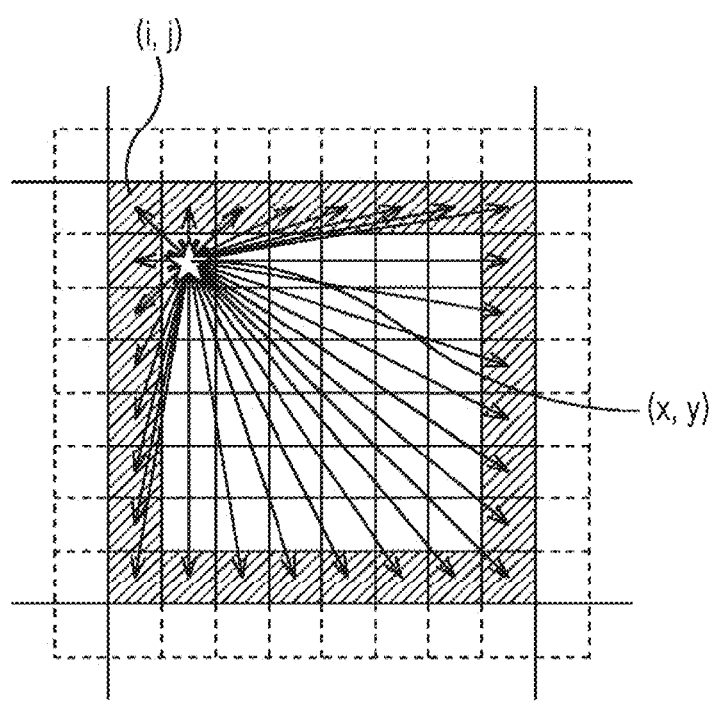
FIG. 6 is a diagram for explaining distances between a current pixel and pixels in the boundary portions in a current block.

For example, where the pixel position of the current pixel denoted by a star in the current block is expressed as (x, y) as shown in FIG. 6, the weight information $w_{xy}(i, j)$ corresponding to the distance between the boundary pixel in a pixel position (i, j) and the current pixel is expressed by the following equation (2).

[Mathematical Formula 2]

$$w_{xy}(i, j) = \frac{1}{\|(i, j) - (x, y)\|} \quad (2)$$

Further, weight information $W_{xy}(i, j)$ generated by normalizing the weight information $w_{xy}(i, j)$ with the weight information corresponding to the distances between the current pixel and all the boundary pixels in the current block is expressed by the following equation (3).

[Mathematical Formula 3]

$$W_{xy}(i, j) = \frac{w_{xy}(i, j)}{\sum_{i,j}^{boundary} w_{xy}(i, j)} \quad (3)$$

The weight information $W_{xy}(i, j)$ is determined by the block size of the current block and the pixel position of the current pixel in the current block, and the same weight information is also given to each of the blocks constituting the image. Therefore, once determined, the weight information $W_{xy}(i, j)$ does not need to be determined on a block-by-block basis. For example, the weight information $W_{xy}(i, j)$ once determined is stored in a storage area or the like (not shown), so that the calculation costs can be reduced.

The correction value $P_{xy}$ for the current pixel in the pixel position (x, y) is determined based on the weight information $W_{xy}(i, j)$ obtained in this manner and the boundary difference value S(i, j), according to the following equations (4).

[Mathematical Formula 4]

$$\begin{cases} P_{xy} = \sum_{i,j}^{boundary} \{W_{xy}(i, j) \times S(i, j)\}(\|(i, j) - (x, y)\| \neq 0) \\ P_{xy} = S(i, j)(\|(i, j) - (x, y)\| = 0) \end{cases} \quad (4)$$

In a case where the pixel position (x, y) of the current pixel is not the pixel position (i, j) of a boundary pixel, the correction value $P_{xy}$ for the current pixel can be determined by the total sum of the products of the weights corresponding to the distances between the current pixel and all the boundary pixels and the boundary difference values of all the boundary pixels in the pixel block.

In a case where the pixel position (x, y) of the current pixel is the pixel position (i, j) of a boundary pixel, or where the distance between a boundary pixel and the current pixel is 0, the weight information $W_{xy}(i, j)$ expressed by the equation (3) is not defined. Therefore, the correction value $P_{xy}$ for the current pixel can be determined by the boundary difference value S(i, j)=S(x, y) in the pixel position (x, y)=(i, j) of the current pixel.

In the above described manner, the correction value for the current pixel is calculated.

Referring back to FIG. 4, in step S53, the adding unit 53 adds the correction value $P_{xy}$ for the current pixel supplied from the correction value calculating unit 52 to the pixel value of the current pixel in the MC image.

In step S54, the block noise correcting unit 33 determines whether the processing has been performed for all the pixels in the current block.

If it is determined in step S54 that the processing has not been performed for all the pixels in the current block, the process returns to step S52, and the procedures of steps S52 through S54 are repeated.

If it is determined in step S54 that the processing has been performed for all the pixels in the current block, or if the correction value has been determined for all the pixels in the current block as current pixels and been added to the pixel value of the current pixel in the MC image, the process moves on to step S55.

In step S55, the block noise correcting unit 33 determines whether the processing has been performed for all the blocks.

If it is determined in step S55 that the processing has not been performed for all the blocks, the process returns to step S51, and the above procedures are repeated until the processing has been performed for all the blocks.

If it is determined in step S55 that the processing has been performed for all the blocks, or if the processing has been performed for all the blocks in the image as current blocks, the block noise correction process comes to an end. The process then returns to step S13 of the flowchart shown in FIG. 3.

Through the above described process, the difference value between the pixel value of a boundary pixel in the Cur image and the pixel value of a boundary pixel in the MC image is calculated, a correction value for the current pixel is calculated based on the differences and the weight corresponding to the distance between the current pixel and the boundary pixel, and the correction value for the current pixel is added to the pixel values of the MC image. As described above, the pixel value of a boundary pixel in the Cur image is compared with the pixel value of a boundary pixel in the MC image, to determine whether there is block noise of a certain intensity in the MC image. Accordingly, even high-intensity block noise caused by low-precision block matching can be corrected more accurately without degradation of image quality. Also, the above described process is a process only for DC components, in terms of a frequency space, and does not in any way affect AC components. Accordingly, block noise can be corrected more accurately, without blurring of the image or degradation of the image quality.

In the above description, the correction value for the current pixel is calculated, with all the pixels in the boundary portions adjacent to adjacent blocks in the current block being the boundary pixels. However, the pixels in the boundary portions adjacent to the adjacent blocks in the current block minus some pixels may be used as boundary pixels, and the correction value for the current pixel may be then calculated.

Figure 7:
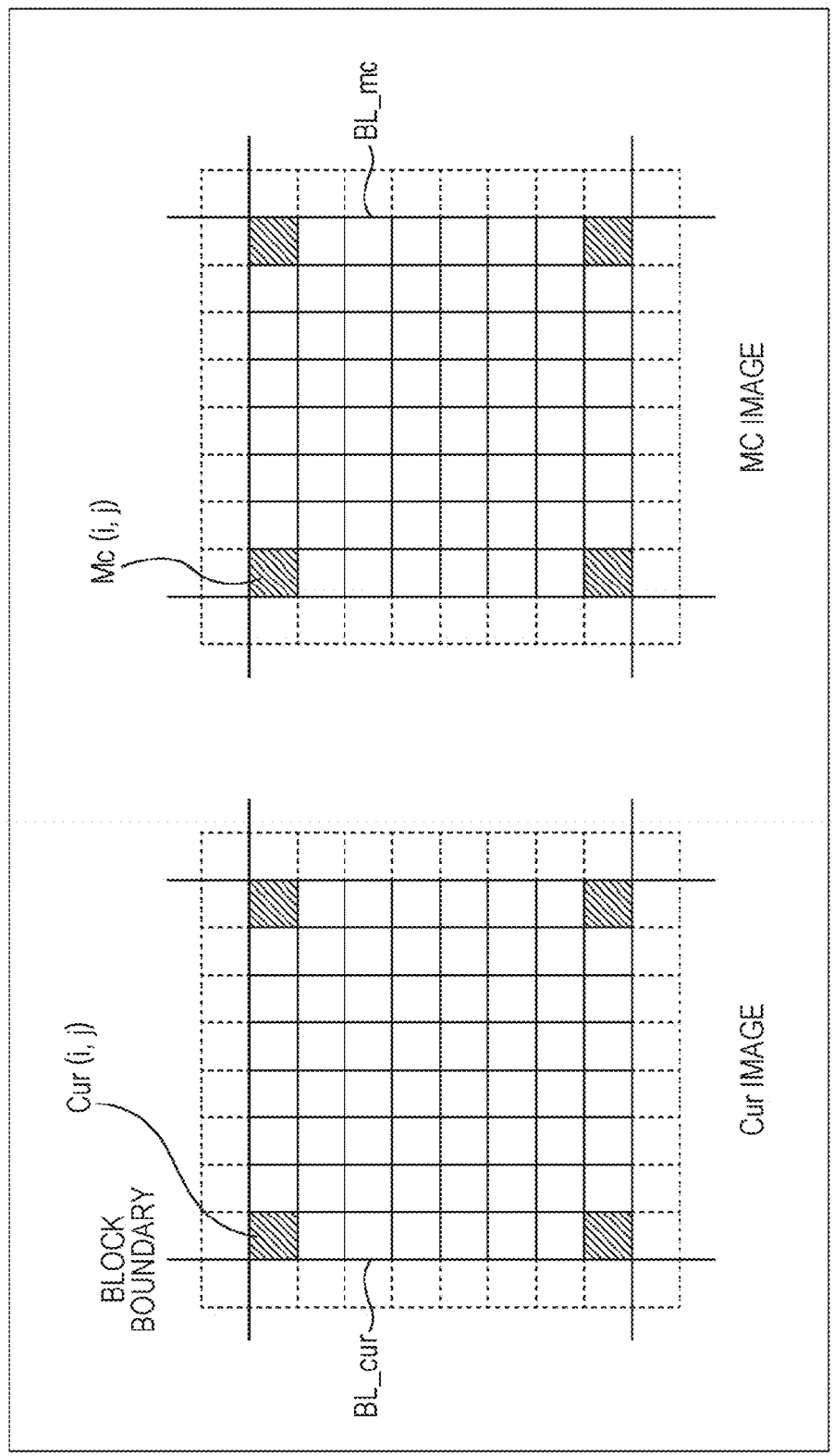
FIG. 7 is a diagram for explaining a reduced number of pixels in the boundary portions in a block.

Specifically, as shown in FIG. 7, the boundary pixels in the current blocks BL_cur and BL_mc may be the pixels located at the four corners of the respective current blocks BL_cur and BL_mc (the shaded pixels in the drawing), for example.

Accordingly, the calculation cost required for calculating a correction value can be reduced.

Also, in calculating the correction value $P_{xy}$ for the current pixel in the above description, when the distance between a boundary pixel and the current pixel is 0, the weight information $W_{xy}(i, j)$ is not defined. Therefore, the correction value $P_{xy}$ for the current pixel is determined by the boundary difference value $S(i, j)=S(x, y)$ in the pixel position $(x, y)=(i, j)$ of the current pixel. However, the weight information in this case may be defined beforehand as shown in the following equations (5).

[Mathematical Formula 5]

$$\begin{cases} w_{xy}(i, j) = \frac{1}{\|(i, j) - (x, y)\|}(\|(i, j) - (x, y)\| \neq 0) \\ w_{xy}(i, j) = \alpha(\|(i, j) - (x, y)\| = 0) \end{cases} \quad (5)$$

When the pixel position (x, y) of the current pixel is not the pixel position (i, j) of a boundary position, $w_{xy}(i, j)$ determined by the upper equation of the equations (5) is the same as the equation (2). When the pixel position (x, y) of the current pixel is the pixel position (i, j) of a boundary pixel, on the other hand, $w_{xy}(i, j)$ determined by the lower equation of the equations (5) is a predetermined value α, which may be α=1, for example. The value α is determined by a trade-off between a block noise removing effect and noise amplification. When the value a becomes larger, the block noise removing effect becomes greater, but noise is amplified. When the value a becomes smaller, the block noise removing effect becomes smaller, but noise is reduced.

In calculating the correction value $P_{xy}$ for the current pixel, the correction value $P_{xy}$ for the current pixel may not be determined when the distance between a boundary pixel and the current pixel is 0.

The image processing device 11 shown in FIG. 1 may further include a block noise detecting unit that detects block noise from the blocks in the MC image, so that the above described block noise correction process is performed only on the block from which block noise has been detected.

<4. Example Structure of an Image Processing Device Including a Block Noise Detecting Unit>

Figure 8:
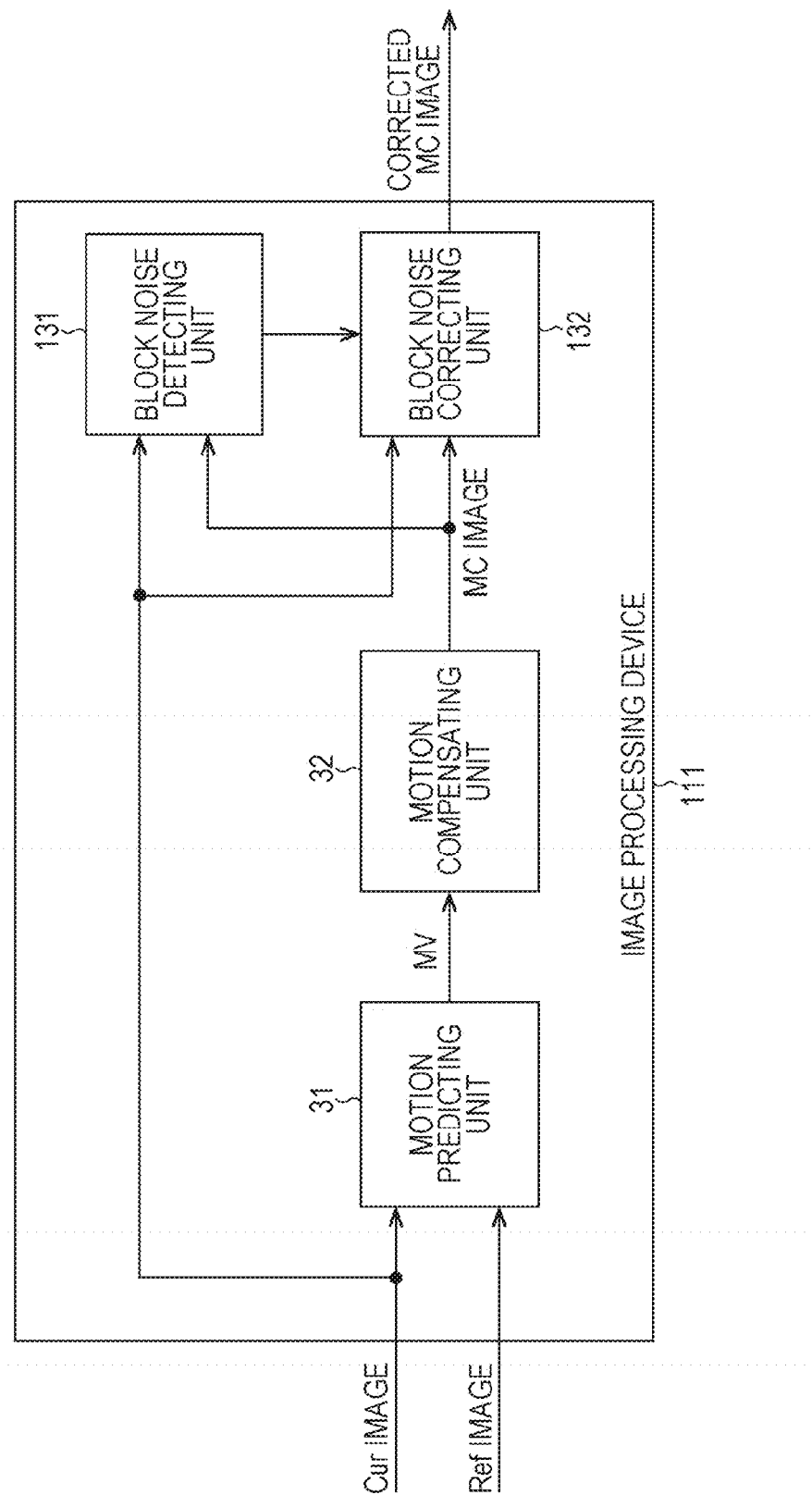
FIG. 8 is a block diagram showing an example functional structure of an image processing device that includes a block noise detecting unit.

Referring now to FIG. 8, an example structure of an image processing device that includes a block noise detecting unit is described.

The image processing device 111 shown in FIG. 8 includes a motion predicting unit 31, a motion compensating unit 32, a block noise detecting unit 131, and a block noise correcting unit 132.

In the image processing device 111 shown in FIG. 8, the components having the same functions as those of the image processing device 11 shown in FIG. 1 have the same names and are denoted by the same reference numerals as those used in the image processing device 11, and explanation of them is not repeated herein.

The block noise detecting unit 131 compares a Cur image with an MC image supplied from the motion compensating unit 32, to detect block noise included in the MC image and supply the detection result to the block noise correcting unit 132. Specifically, the block noise detecting unit 131 calculates the difference values in pixel value between pixels in the Cur image and pixels in the MC image, and detects block noise included in the blocks in the MC image based on the difference values.

The block noise correcting unit 132 calculates a correction value for the block from which the block noise detecting unit 131 has detected block noise based on the Cur image and the MC image supplied from the motion compensating unit 32, so as to correct the block noise included in the MC image of the block and outputs a corrected MC image.

[Block-Noise-Corrected MC Image Output Process]

Figure 9:
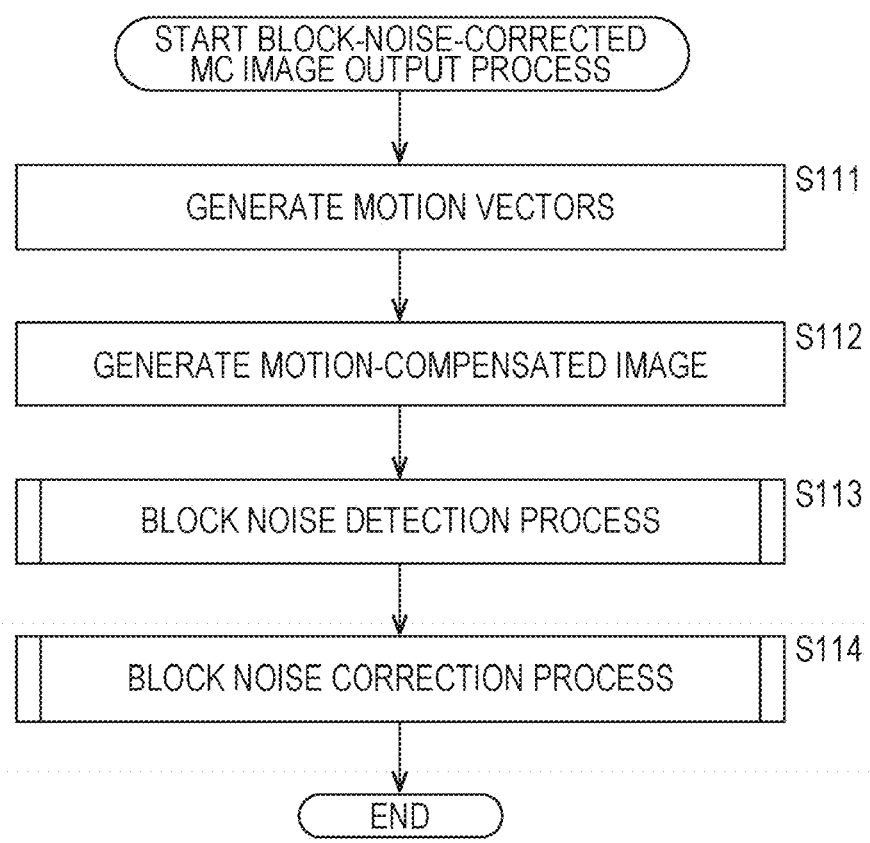
FIG. 9 is a flowchart for explaining a block-noise-corrected MC image output process.

Referring now to the flowchart shown in FIG. 9, a block-noise-corrected MC image output process to be performed by the image processing device 111 shown in FIG. 8 is described.

The procedures of steps S111 and S112 of the flowchart shown in FIG. 9 are the same as the procedures of steps S11 and S12 of the flowchart shown in FIG. 3, respectively, and therefore, explanation of them is not repeated herein.

In step S113, the block noise detecting unit 131 performs a block noise detection process, to detect block noise included in the MC image and supply the detection result to the block noise correcting unit 132. The block noise detection process will be described later in detail.

In step S114, the block noise correcting unit 132 performs a block noise correction process on the block from which the block noise detecting unit 131 has detected block noise, to correct the block noise included in the MC image and output the corrected MC image as a result of the correction. Here, the block noise correction process described above with reference to the flowchart shown in FIG. 4 is performed as the block noise correction process.

Through this process, the above described block noise correction process is performed only on the block from which block noise has been detected. Accordingly, the block noise correction process is not performed on the blocks in which no block noise has occurred, and unnecessary processing can be avoided.

<5. Example Structures of the Block Noise Detecting Unit and the Block Noise Correcting Unit>

Figure 10:
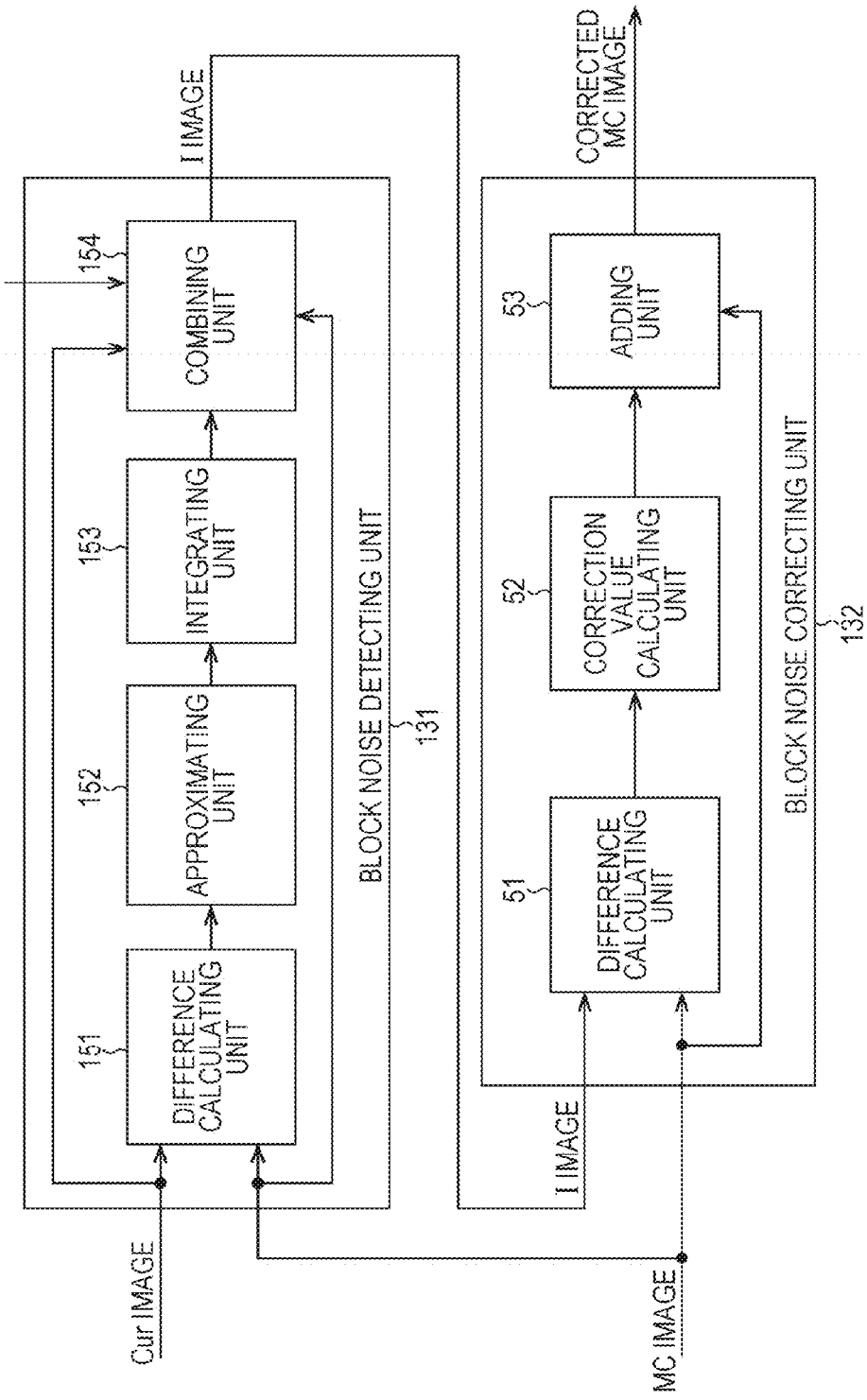
FIG. 10 is a block diagram showing example structures of the block noise detecting unit and the block noise correcting unit.

Referring now to FIG. 10, specific example structures of the block noise detecting unit and the block noise correcting unit are described.

The block noise detecting unit 131 shown in FIG. 10 compares a Cur image with an MC image supplied from the motion compensating unit 32, to detect block noise included in the MC image. As a result of the detection, the block noise detecting unit 131 supplies the amount of the block noise and a combined image to the block noise correcting unit 132. The combined image is formed by combining the Cur image and the MC image in accordance with the distribution of the noise intensity that corresponds to image luminance values and is derived from the image sensor.

The block noise detecting unit 131 shown in FIG. 10 includes a difference calculating unit 151, an approximating unit 152, an integrating unit 153, and a combining unit 154.

The difference calculating unit 151 calculates the difference values in pixel value between pixels in the Cur image and pixels in the MC image supplied from the motion compensating unit 32, and supplies the difference values to the approximating unit 152.

Using a predetermined function, the approximating unit 152 approximates the difference values supplied from the difference calculating unit 151, and supplies the result to the integrating unit 153.

The integrating unit 153 performs an integrating process on the function supplied from the approximating unit 152, and supplies the resultant value of the integral as the amount of block noise in the block to the combining unit 154.

The combining unit 154 generates a combined image (hereinafter referred to as the I image) formed by combining the pixel values of the pixels in the Cur image and the pixel values of the pixels in the MC image supplied from the motion compensating unit 32 in accordance with the value of the integral supplied from the integrating unit 153 and predetermined distribution information indicating the noise intensity corresponding to image luminance values, and supplies the I image to the block noise correcting unit 132.

The block noise correcting unit 132 shown in FIG. 10 calculates a correction value for correcting the pixel values of the pixels in the MC image based on the I image supplied from the block noise detecting unit 131 and the MC image supplied from the motion compensating unit 32, to correct the block noise included in the MC image and output the corrected MC image.

The block noise correcting unit 132 shown in FIG. 10 has the same structure as the block noise correcting unit 33 shown in FIG. 2, and therefore, explanation thereof is not repeated herein.

However, the difference calculating unit 51 shown in FIG. 10 calculates the difference values between the pixel values of the pixels in the I image and the pixel values of the pixels in the Mc image, and supplies the difference values to the correction value calculating unit 52. Specifically, with respect to the pixels (boundary pixels) in the boundary portions adjacent to the adjacent blocks of the current block, the difference calculating unit 51 shown in FIG. 10 calculates boundary difference values that are the difference values between the pixel values of the I image and the pixel values of the Mc image. Accordingly, the correction value calculating unit 52 shown in FIG. 10 calculates a correction value based on the boundary difference value between the I image and the Mc image with respect to the boundary pixels in the current block.

[Block Noise Detection Process]

Figure 11:
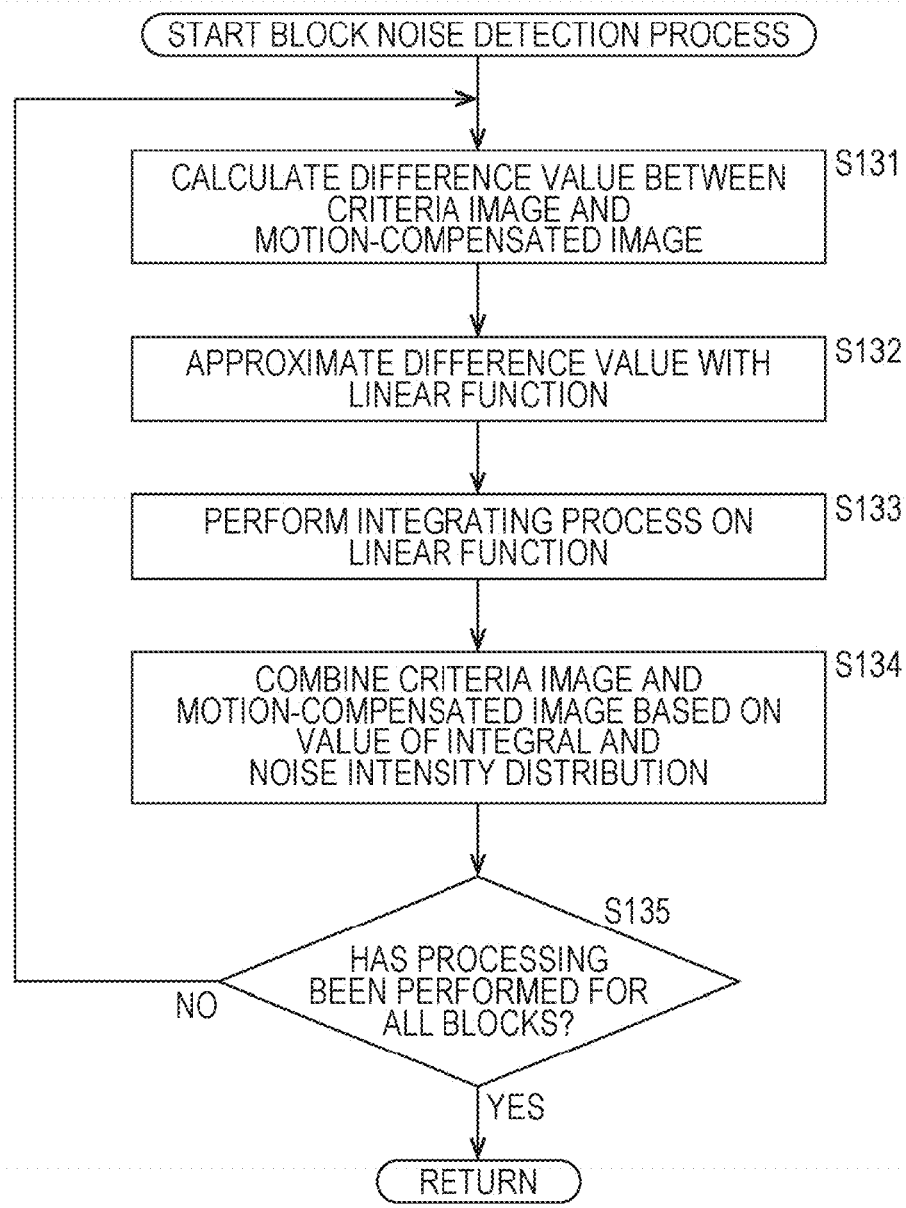
FIG. 11 is a flowchart for explaining a block noise detection process to be performed by the block noise detecting unit shown in FIG. 10.

Referring now to the flowchart shown in FIG. 11, a block noise detection process to be performed by the block noise detecting unit 131 shown in FIG. 10 is described.

In step S131, the difference calculating unit 151 calculates the difference values in pixel value between the pixels in the boundary portions adjacent to the adjacent blocks of the current block in a Cur image and the pixels in the boundary portions adjacent to the adjacent blocks of the current block in an MC image supplied from the motion compensating unit 32, and supplies the difference values to the approximating unit 152. Specifically, the difference calculating unit 151 calculates the difference values between the pixel values of the pixels constituting the four sides of the current block in the Cur image and the pixel values of the pixels constituting the four sides of the current block in the MC image.

In step S132, using a linear function, the approximating unit 152 approximates the difference values with respect to the four sides of the current block supplied from the difference calculating unit 151, and supplies the result to the integrating unit 153.

Figure 12:
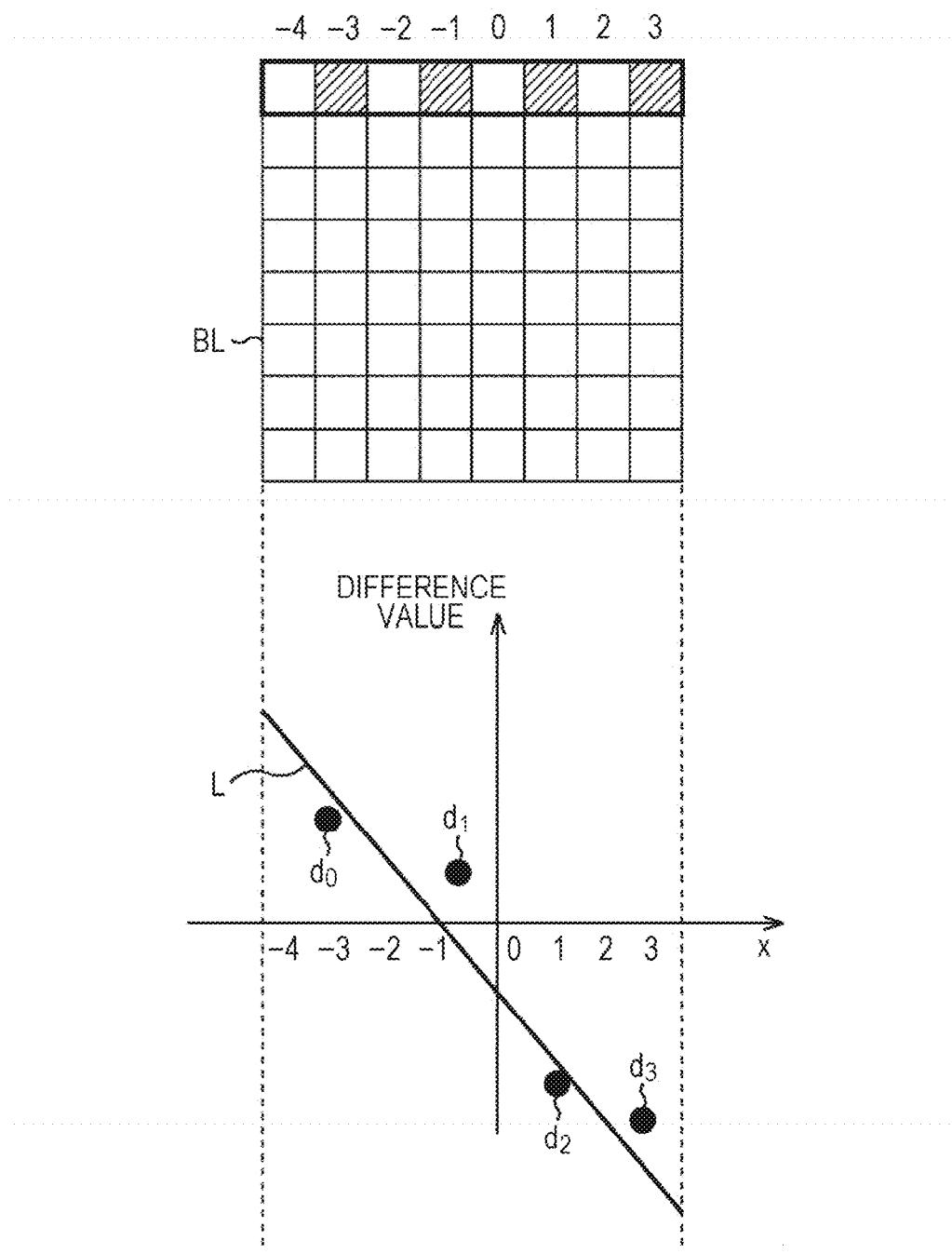
FIG. 12 is a diagram for explaining approximation of difference values.

For example, as for the 8×8 pixels current block BL shown in FIG. 12, the difference values with respect to the pixels constituting the upper side (surrounded by the solid line in the drawing) of the four sides are represented by $d_0$ through $d_3$. Since the current block BL is formed with 8×8 pixels, eight difference values are calculated for each side. However, the number of pixels is reduced (by removing one in each two pixels) in this example, and the four difference values $d_0$ through $d_3$ are calculated with respect to the four pixels in the pixel positions −3, −1, 1, and 3. By calculating the difference values with respect to a reduced number of pixels as described above, the calculation costs can be reduced.

In this case, the approximating unit 152 calculates a primary approximate straight line L with respect to the four difference values $d_0$ through $d_3$. As the primary approximate straight line is determined in the above manner, the influence of noise that is included in the Cur image and is derived from the image sensor can be reduced.

In step S133, the integrating unit 153 performs an integrating process on the linear function calculated by the approximating unit 152, and supplies the value of the integral determined with respect to each of the four sides of the current block to the combining unit 154.

That is, where the pixel positions shown in FIG. 12 are expressed in the x-axis coordinate, the integrating unit 153 performs an integrating process on the linear function calculated by the approximating unit 152, by using the following equation (6).

[Mathematical Formula 6]

$$M = \int_{-4}^{3} |ax + b| dx \tag{6}$$

In the equation (6), the value a represents the inclination of the primary approximate straight line L, and the value b represents the intercept of the primary approximate straight line L.

When the value a and the value b are calculated with the difference values $d_0$ through $d_3$ by the method of least squares, the equation (6) is expressed by the following equation (7).

[Mathematical Formula 7]

$$M = \int_{-4}^{3} \left| \frac{3d_0 + d_1 - d_2 - 3d_3}{20} x + \frac{-2d_0 + d_1 + 4d_2 + 7d_3}{10} \right| dx \tag{7}$$

In this manner, four values of the integral M for the four sides of the current block are obtained.

Referring back to the flowchart shown in FIG. 11, in step S134, based on the values of the integral with respect to the respective four sides of the block supplied from the integrating unit 153, and the predetermined distribution of noise intensity with respect to image luminance values, the combining unit 154 combines the pixel values of the pixels in the Cur image and the pixel values of the pixels in the MC image supplied from the motion compensating unit 32.

Figure 13:
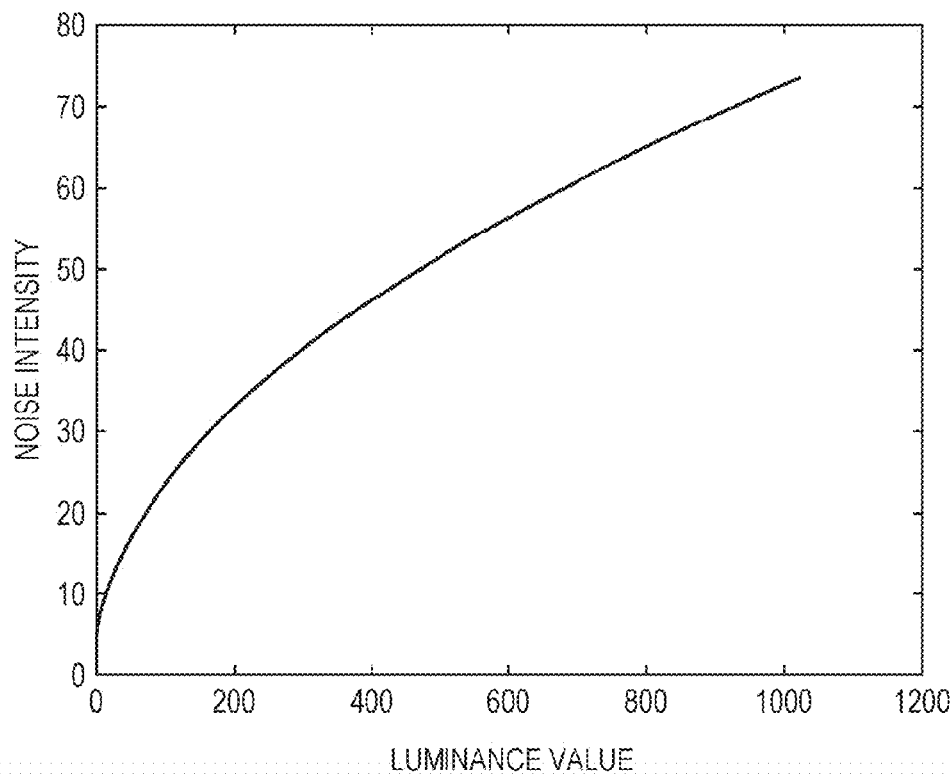
FIG. 13 is a diagram for explaining noise intensity with respect to luminance values.

FIG. 13 shows the noise intensity of an image obtained by an imaging apparatus (not shown) with respect to luminance values.

In FIG. 13, the abscissa axis indicates the luminance values of pixels, and the ordinate axis indicates noise intensity. As the noise intensity varies with pixels, a noise intensity distribution is determined beforehand for each of the pixels in the entire image, and the noise intensity shown in FIG. 13 is obtained based on the noise intensity distribution.

Noise intensity is given for luminance values (luminance signals) of the three channels of R, G, and B, and the noise intensity shown in FIG. 13 indicates the noise intensity of a G signal, for example.

Specifically, based on the luminance values (such as G signals) of the pixels in the Cur image of the current block, the combining unit 154 sets an index value $\sigma_1$ indicating the distribution of noise intensity corresponding to the luminance values in accordance with the relationship shown in FIG. 13. Based on the index value $\sigma_1$ and an index value $\sigma_2$ indicating the block noise distribution in accordance with the values of the integral M with respect to the respective four sides of the block supplied from the integrating unit 153, the combining unit 154 calculates a weighted average i of the Cur image and the MC image with respect to the four sides of the current block by using the equation (8) shown below. Specifically, based on the index value $\sigma_1$ with respect to the boundary pixels on each of the sides of the current block and the index value $\sigma_2$ in accordance with the value of the integral M of each of the sides of the current block, the combining unit 154 calculates the weighted average of the Cur image and the MC image according to the equation (8).

[Mathematical Formula 8]

$$i = \frac{\sigma_2^2 \times Cur + \sigma_1^2 \times Mc}{\sigma_1^2 + \sigma_2^2} \quad (8)$$

Here, the index value $\sigma_2$ indicating the block noise distribution is expressed by the following equation (9).

[Mathematical Formula 9]

$$\sigma_2 = \beta \times M \quad (9)$$

The value $\beta$ in the equation (9) is an adjustment parameter, and may be $\beta=0.1$, for example.

In step S135, the combining unit 154 determines whether the processing has been performed for all the blocks.

If it is determined in step S135 that the processing has not been performed for all the blocks, the process returns to step S131, and the procedures thereafter are repeated.

If it is determined in step S135 that the processing has been performed for all the blocks, on the other hand, the combining unit 154 generates an I image from the weighted average i calculated for each of the boundary pixels in all the blocks, and supplies the I image to the block noise correcting unit 132. The block noise detection process then comes to an end. In this manner, the I image formed only with the boundary pixels in blocks is supplied to the block noise correcting unit 132. In the I image, the weighted average i with respect to the boundary pixels at the four corners of each block is calculated twice. However, either of the values may be used, or the average value of them may be calculated, for example.

[Block Noise Correction Process]

Next, a block noise correction process to be performed by the block noise correcting unit 132 shown in FIG. 10 is described. However, this block noise correction process is basically the same as the block noise correction process described above with reference to the flowchart shown in FIG. 4, except that an I image formed only with the boundary pixels in blocks is input, instead of a Cur image. Therefore, explanation of the block noise correction process is not repeated herein.

The block noise correction process to be performed by the block noise correcting unit 132 shown in FIG. 10 can achieve the same effects as those of the block noise correction process shown in the flowchart in FIG. 4.

In a case where the index value $\sigma_2$ indicating the block noise distribution is a fixed value in the above equation (8), the weighted average i is a value determined by the noise intensity distribution. In a case where the index value $\sigma_1$ indicating the distribution of noise intensity corresponding to luminance values is a fixed value, the weighted average i is a value determined by the block noise distribution.

Figure 14:
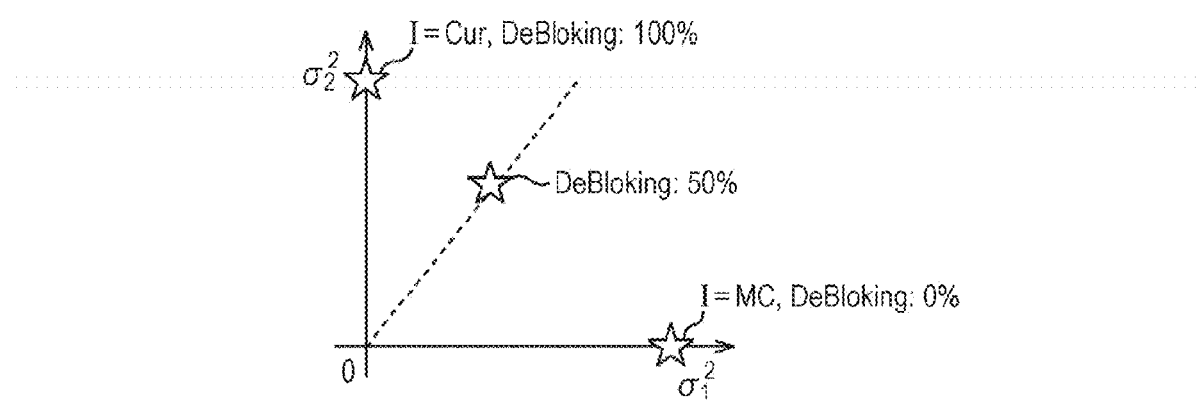
FIG. 14 is a diagram for explaining a combined image of a Cur image and an LMC image.

Also, according to the above equation (8), when the index value $\sigma_2$ indicating the block noise distribution is 0, the I image with respect to the current block is the same as the MC image as shown in FIG. 14, and no processing is performed in the block noise correction process at the block noise correcting unit 132 (deblocking: 0%). When the index value $\sigma_1$ indicating the distribution of noise intensity corresponding to luminance values is 0, the I image with respect to the current block is the Cur image, and exactly the same process as the block noise correction process described above with reference to the flowchart shown in FIG. 4 is performed in the block noise correcting process at the block noise correcting unit 132 (deblocking: 100%). Further, when $\sigma_1=\sigma_2$, a correction process that is half the block noise correction process described above with reference to the flowchart shown in FIG. 4 is performed in the block noise correction process at the block noise correcting unit 132 (deblocking: 50%).

That is, the block noise correction amount (correction value) in the block noise correction process at the block noise correcting unit 132 shown in FIG. 10 is controlled by the block noise detection process shown in FIG. 11.

In the weighted average i expressed by the above equation (8), the squares of the index values $\sigma_1$ and $\sigma_2$ are used as the weights on the Cur image and the MC image. However, the index values $\sigma_1$ and $\sigma_2$ may be used as they are, as shown in the following equation (10).

[Mathematical Formula 10]

$$i = \frac{\sigma_2 \times Cur + \sigma_1 \times Mc}{\sigma_1 + \sigma_2} \quad (10)$$

Figure 15:
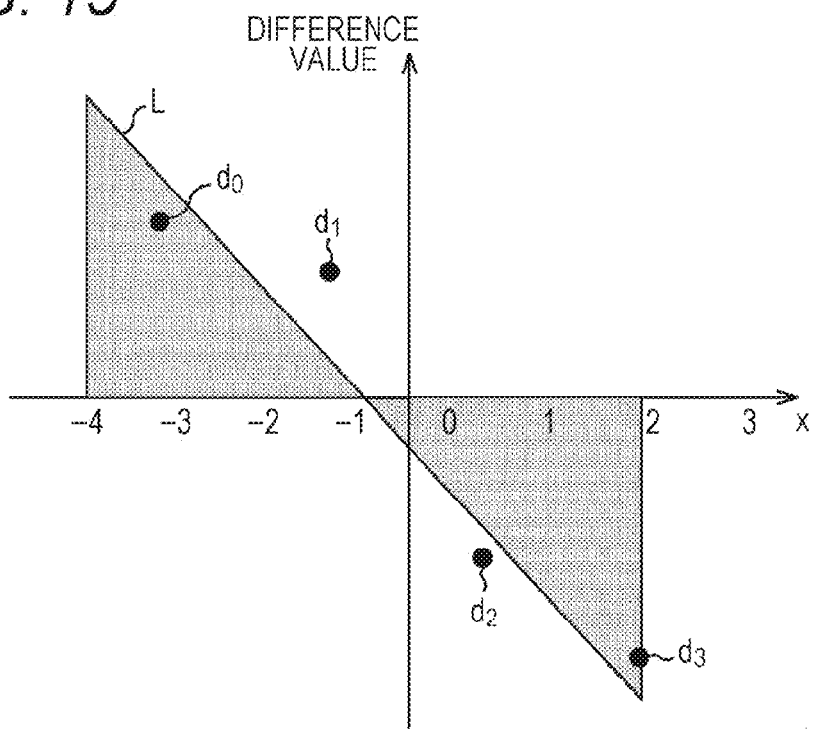
FIG. 15 is a diagram for explaining an integrating process.

Although an integrating process is performed on the primary approximate straight line L in step S133, this is the same as calculating the area of the shaded regions defined by the x-axis and the primary approximate straight line L as shown in FIG. 15.

To simplify the process, quadrature by parts, instead of the integrating process for the primary approximate straight line L, may be used for the primary approximate straight line L.

Figure 16:
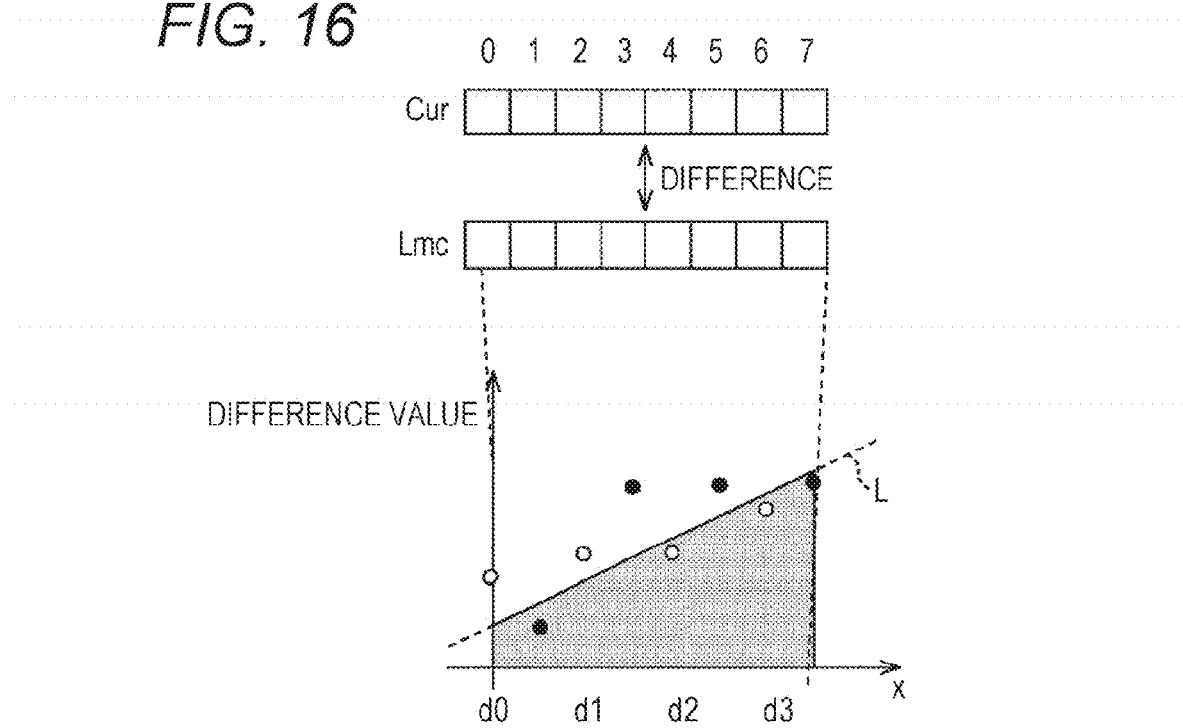
FIG. 16 is a diagram for explaining quadrature by parts.
Figure 17:
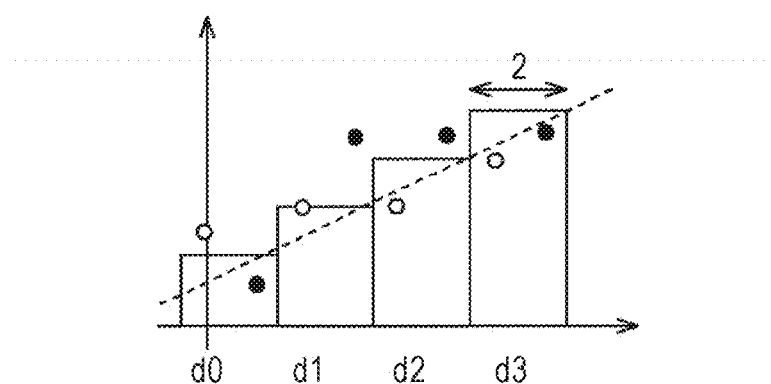
FIG. 17 is a diagram for explaining quadrature by parts.

For example, in a case where there are difference values and a primary approximate straight line L with respect to a predetermined one side of the current block, as shown in FIG. 16, the value of the integral with respect to the primary approximate straight line L, or the area of the shaded region, can be determined by calculating the areas of the four rectangular regions shown in FIG. 17.

In a case where one block is formed with 8×8 pixels, and a value of integral (area) is calculated by using four pixels (difference values) of one side of the block, the width of each of the rectangles in FIG. 17 is 2, and the heights of the rectangles form the primary approximate straight line L with respect to the respective pixels.

Where the area of the four rectangular regions is represented by A, the area A is expressed by the following equation (11).

[Mathematical Formula 11]

$$A = \left(\left|\frac{-2d_0 + d_1 + 4d_2 + 7d_3}{10}\right| + \left|\frac{d_0 + 2d_1 + 3d_2 + 4d_3}{10}\right| + \left|\frac{4d_0 + 3d_1 + 2d_2 + d_3}{10}\right| + \left|\frac{7d_0 + 4d_1 + d_2 - 2d_3}{10}\right|\right) \times 2 \quad (11)$$

In the equation (11), $d_0$ represents the difference value in the position x=0, $d_1$ represents the difference value in the position x=2, $d_2$ represents the difference value in the position x=4, and $d_3$ represents the difference value in the position x=6. The equation (11) can be expanded as shown in the following equation (12).

[Mathematical Formula 12]

$$5A = |-2d_0+d_1+4d_2+7d_3|+|d_0+2d_1+3d_2+4d_3|+|4d_0+3d_1+2d_2+d_3|+|7d_0+4d_1+d_2-2d_3| \quad (12)$$

As described above, calculations are simplified by the use of quadrature by parts, instead of an integrating process. Accordingly, the calculation costs can be reduced.

<6. Other Example Structures of the Block Noise Detecting Unit and the Block Noise Correcting Unit>

Figure 18:
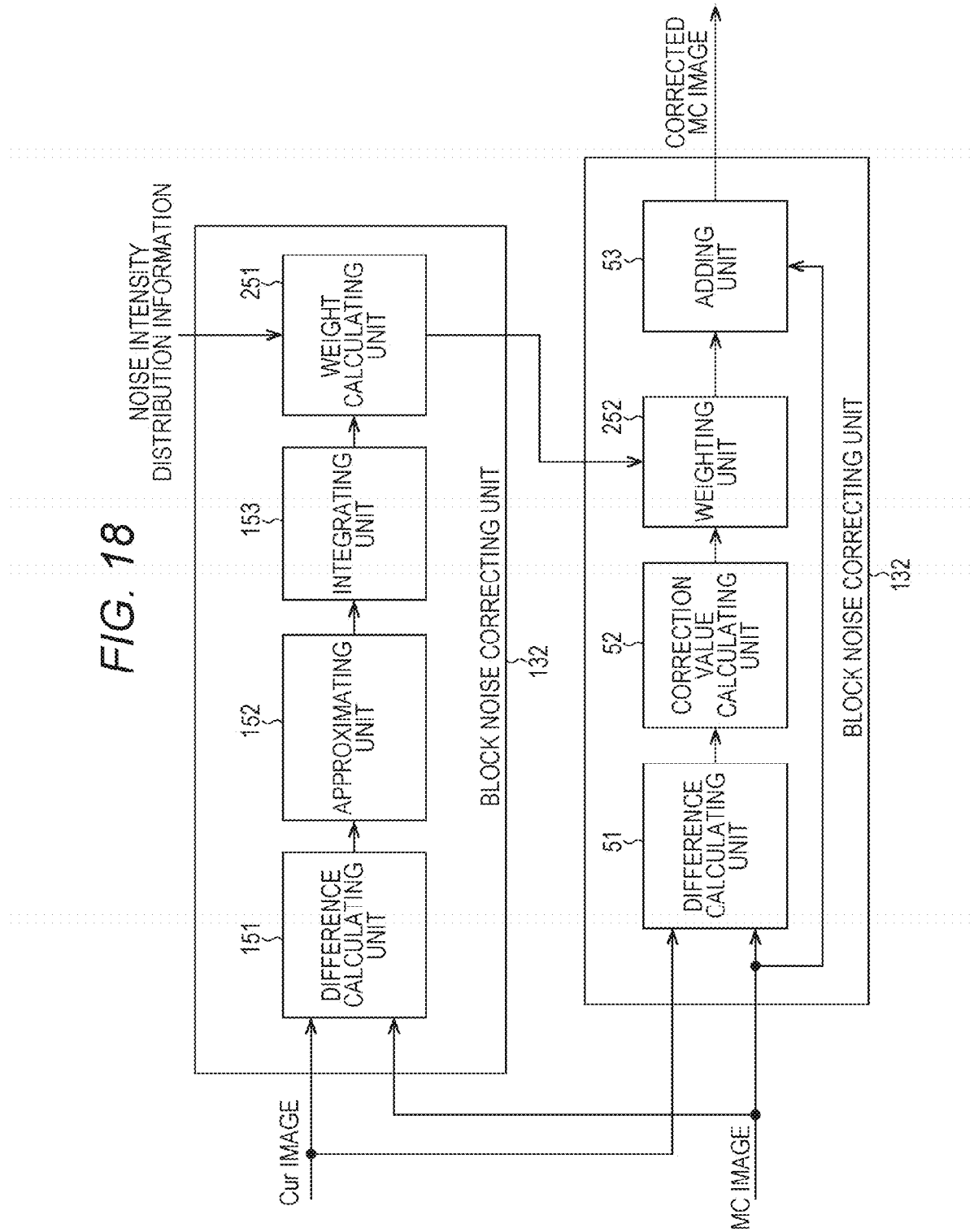
FIG. 18 is a block diagram showing other example structures of the block noise detecting unit and the block noise correcting unit.

Referring now to FIG. 18, other example structures of the block noise detecting unit and the block noise correcting unit are described.

The block noise detecting unit 131 shown in FIG. 18 compares a Cur image with an MC image supplied from the motion compensating unit 32, to detect block noise included in the MC image. As a result of the detection, the block noise detecting unit 131 supplies the amount of the block noise and a weight coefficient to the block noise correcting unit 132. The weight coefficient is for weighting the correction value to be calculated by the block noise correcting unit 132 in accordance with the distribution of the noise intensity that corresponds to image luminance values and is derived from the image sensor.

The block noise detecting unit 131 shown in FIG. 18 includes the difference calculating unit 151, the approximating unit 152, the integrating unit 153, and a weight calculating unit 251.

In the block noise detecting unit 131 shown in FIG. 18, the components having the same functions as those of the block noise detecting unit 131 shown in FIG. 10 have the same names and are denoted by the same reference numerals as those shown in FIG. 10, and explanation of them is not repeated herein.

In accordance with the values of the integral supplied from the integrating unit 153 and distribution information indicating the distribution of noise intensity corresponding to image luminance values, the weight calculating unit 251 calculates a weight coefficient for weighing the correction value to be calculated at the block noise correcting unit 132, and supplies the weight coefficient to the block noise correcting unit 132.

The block noise correcting unit 132 shown in FIG. 18 corrects the block noise included in the MC image by using the correction value that is calculated based on the Cur image and the MC image supplied from the motion compensating unit 32 and is weighted with the weight coefficient supplied from the block noise detecting unit 131. The corrected MC image is then output.

The block noise correcting unit 132 shown in FIG. 18 includes the difference calculating unit 51, the correction value calculating unit 52, the adding unit 53, and the weighting unit 252.

In the block noise correcting unit 132 shown in FIG. 18, the components having the same functions as those of the block noise correcting unit 33 shown in FIG. 2 have the same names and are denoted by the same reference numerals as those shown in FIG. 2, and explanation of them is not repeated herein.

The weighting unit 252 weights the correction value for the current pixel supplied from the correction value calculating unit 52, by using the weight coefficient supplied from the block noise detecting unit 131. The weighted correction value is supplied to the adding unit 53.

At the adding unit 53, the weighted correction value for the current pixel supplied from the weighting unit 252 is added to the pixel value of the current pixel in the MC image, so that the pixel value of the pixel corresponding to the current pixel is calculated in the corrected MC image.

[Block Noise Detection Process]

Figure 19:
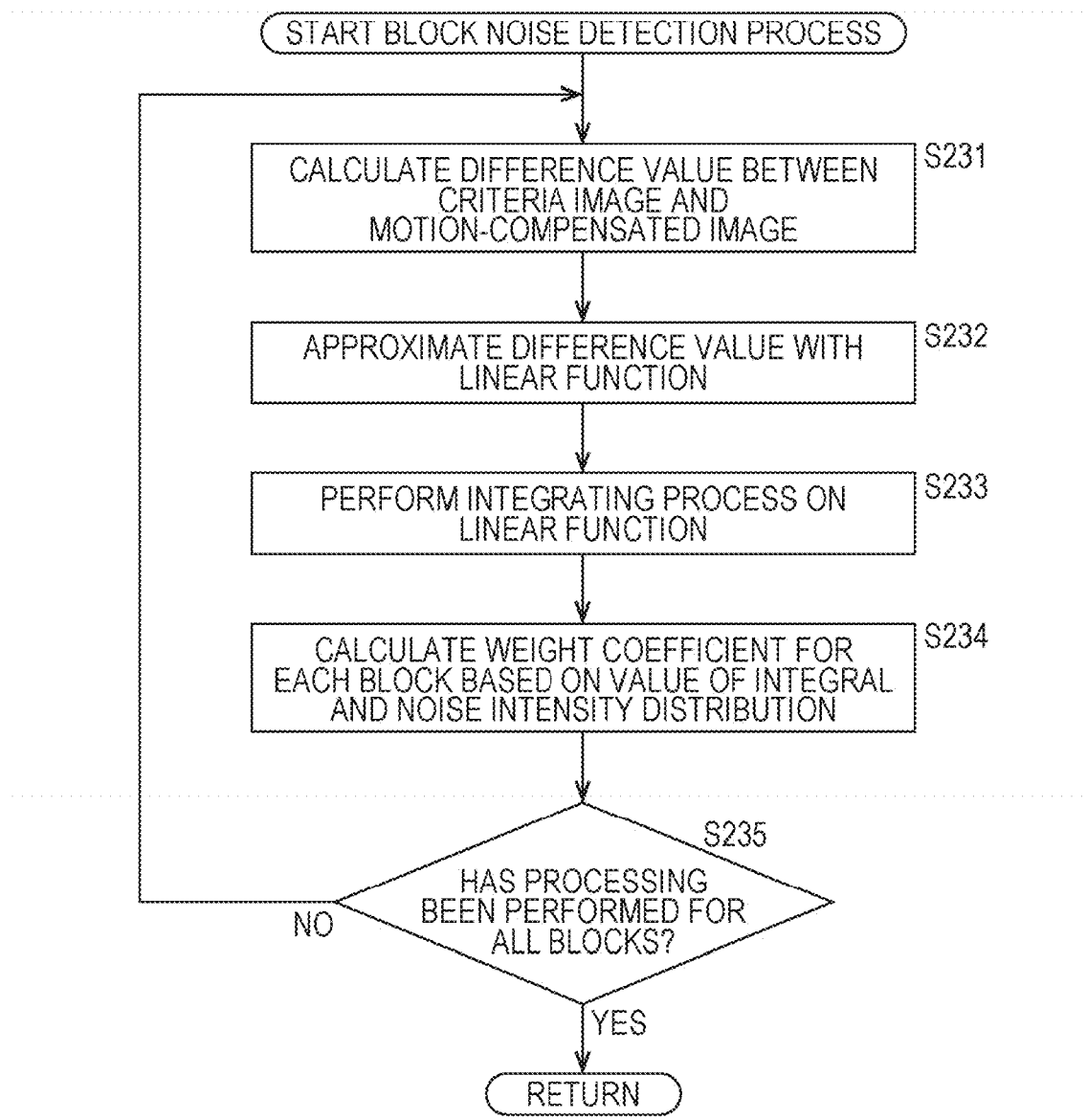
FIG. 19 is a flowchart for explaining a block noise detection process to be performed by the block noise detecting unit shown in FIG. 18.

Referring now to the flowchart shown in FIG. 19, a block noise detection process to be performed by the block noise detecting unit 131 shown in FIG. 18 is described.

The procedures of steps S231 through S233 and S235 of the flowchart shown in FIG. 19 are the same as the procedures of steps S131 through S134 of the flowchart shown in FIG. 11, respectively, and therefore, explanation of them is not repeated herein.

In step S234, the weight calculating unit 251 calculates a weight coefficient for each block in accordance with the values of the integral supplied from the integrating unit 153 with respect to the respective four sides of the block and the predetermined distribution of noise intensity corresponding to image luminance values. The weight coefficient is supplied to the block noise correcting unit 132.

Specifically, based on the luminance values (such as G signals) of the pixels in the Cur image of the current block, the weight calculating unit 251 sets an index value $\sigma_1$ indicating the distribution of noise intensity corresponding to the luminance values in accordance with the relationship shown in FIG. 13. Based on the index value $\sigma_1$ and the index value $\sigma_2$ indicating the block noise distribution expressed by the above equation (9) in which M is the maximum value among the values of the integral M supplied from the integrating unit 153 with respect to the four sides of the block, the weight calculating unit 251 calculates the weight coefficient for the current block by using the following expression (13).

[Mathematical Formula 13]

$$\frac{\sigma_2^2}{\sigma_1^2 + \sigma_2^2} \quad (13)$$

[Block Noise Correction Process]

Figure 20:
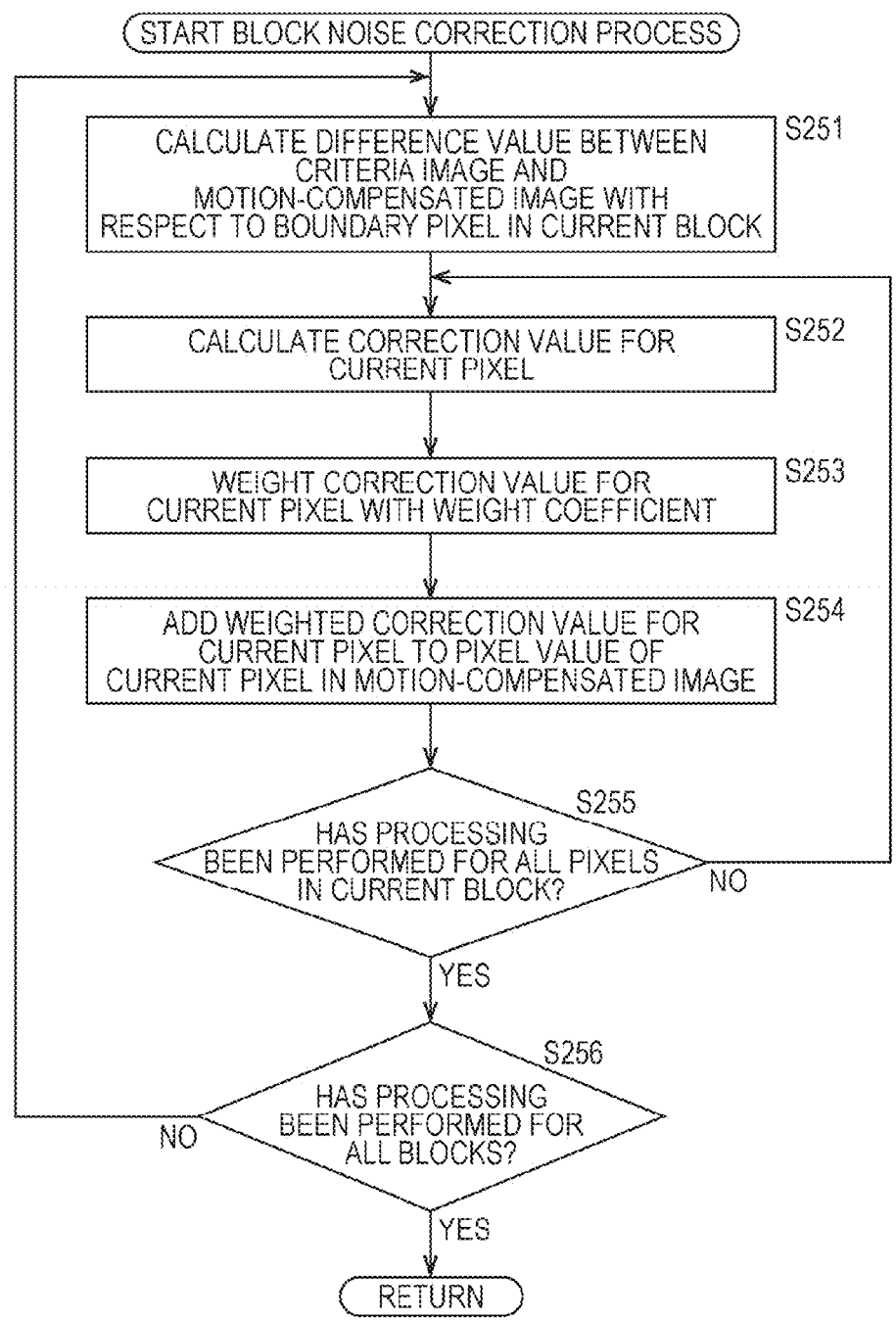
FIG. 20 is a flowchart for explaining a block noise correction process to be performed by the block noise correcting unit shown in FIG. 18.

Referring now to the flowchart shown in FIG. 20, a block noise correction process to be performed by the block noise correcting unit 132 shown in FIG. 18 is described.

The procedures of steps S251, S252, and S254 through S256 of the flowchart shown in FIG. 20 are the same as the procedures of steps S51 through S55 of the flowchart shown in FIG. 4, respectively, and therefore, explanation of them is not repeated herein.

In step S253, the weighting unit 252 weights the correction value for the current pixel supplied from the correction value calculating unit 52, by using the weight coefficient supplied from the block noise detecting unit 131. The weighted correction value is supplied to the adding unit 53.

The block noise correction process shown in the flowchart in FIG. 20 can also achieve the same effects as those of the block noise correction process shown in the flowchart in FIG. 4.

The weight coefficient shown in the above expression (13) becomes larger as the index value $\sigma_2$ indicating the block noise distribution becomes larger. Accordingly, as the index value $\sigma_2$ indicating the block noise distribution becomes larger, the weight on the correction value to be calculated in the block noise correction process becomes larger.

That is, the block noise correction amount (correction value) in the block noise correction process shown in FIG. 20 is controlled by the block noise detection process shown in FIG. 19.

In the weight coefficient shown in the above expression (13), the squares of the index values $\sigma_1$ and $\sigma_2$ are used. However, the index values $\sigma_1$ and $\sigma_2$ may be used as they are, as shown in the following expression (14).

[Mathematical Formula 14]

$$\frac{\sigma_2}{\sigma_1 + \sigma_2} \quad (14)$$

Although an integrating process is performed on the primary approximate straight line L in step S233 of the flowchart shown in FIG. 19, an area calculation process using quadrature by parts as described above with reference to FIGS. 16 and 17 may be performed instead. Calculations are simplified by the use of quadrature by parts, instead of an integrating process. Accordingly, the calculation costs can be reduced.

The series of processes described above can be performed either by hardware or by software. In a case where the series of processes are performed by software, the program forming the software is installed from a program recording medium into a computer incorporated in special-purpose hardware, or into a general-purpose personal computer or the like that can execute various kinds of functions by installing various kinds of programs.

Figure 21:
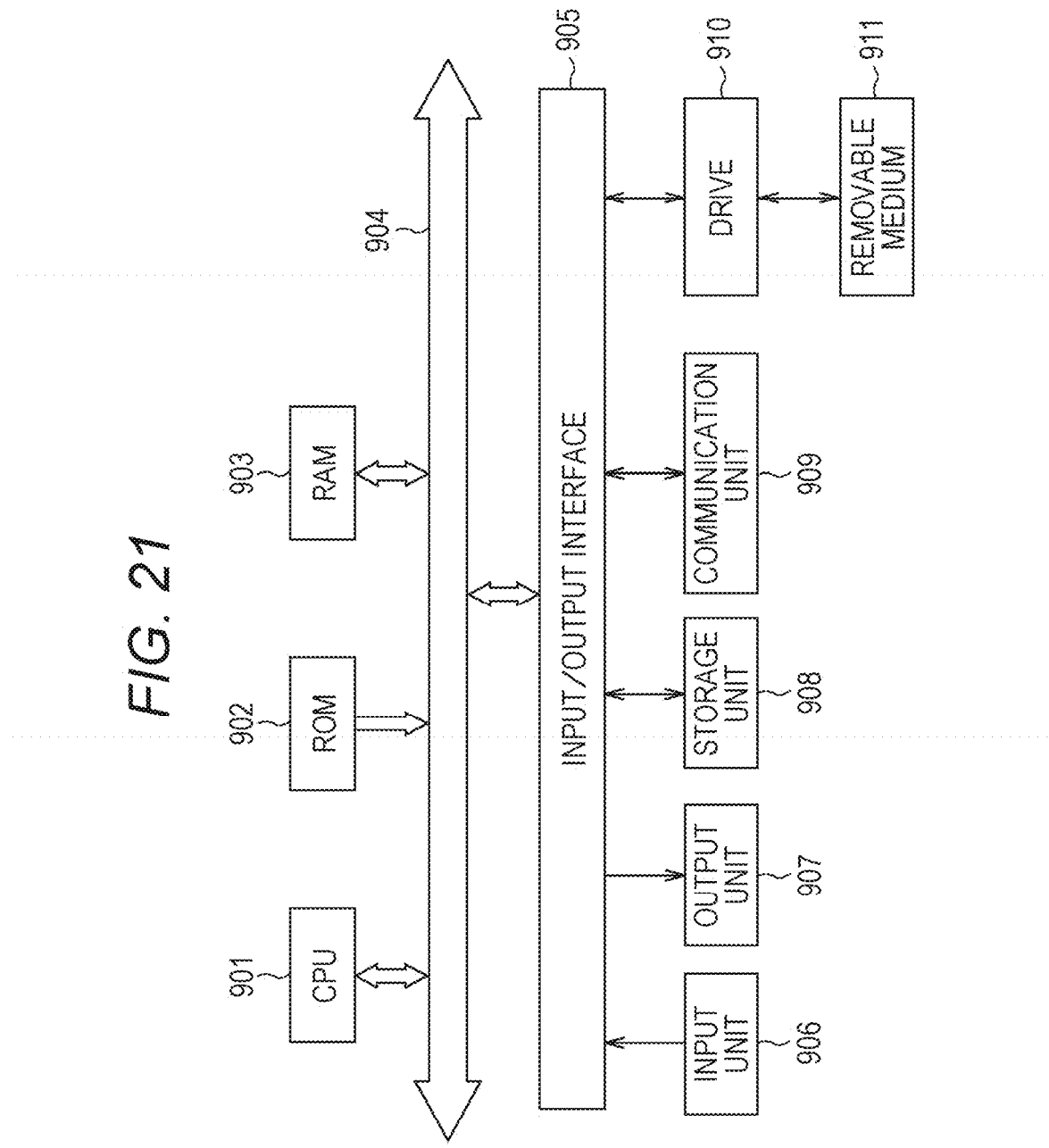
FIG. 21 is a block diagram showing an example configuration of the hardware of a computer.

FIG. 21 is a block diagram showing an example structure of the hardware of a computer that performs the above described series of processes in accordance with a program.

In the computer, a CPU (Central Processing Unit) 901, a ROM (Read Only Memory) 902, and a RAM (Random Access Memory) 903 are connected to one another by a bus 904.

An input/output interface 905 is further connected to the bus 904. The input/output interface 905 has the following components connected thereto: an input unit 906 formed with a keyboard, a mouse, a microphone, and the like; an output unit 907 formed with a display, a speaker, and the like; a storage unit 908 formed with a hard disk, a nonvolatile memory, or the like; a communication unit 909 formed with a network interface or the like; and a drive 910 that drives a removable medium 911 such as a magnetic disk, an optical disk, a magnetooptical disk, or a semiconductor memory.

In the computer having the above described structure, the CPU 901 loads a program stored in the storage unit 908 into the RAM 903 via the input/output interface 905 and the bus 904, and executes the program, so that the above described series of processes are performed.

The programs to be executed by the computer (the CPU 901) are recorded on the removable medium 911 that is a packaged medium formed with a magnetic disk (including a flexible disk), an optical disk (a CD-ROM (Compact Disc-Read Only Memory), a DVD (Digital Versatile Disc), or the like), a magnetooptical disk, or a semiconductor memory, for example, or are provided via a wired or wireless transmission medium such as a local area network, the Internet, or digital satellite broadcasting.

The programs can be installed into the storage unit 908 via the input/output interface 905 when the removable medium 911 is mounted in the drive 910. Also, the programs may be received by the communication unit 909 via a wired or wireless transmission medium, and be installed into the storage unit 908. Alternatively, the programs may be installed beforehand into the ROM 902 or the storage unit 908.

The programs to be executed by the computer may be programs for performing processes in chronological order in accordance with the sequence described in this specification, or may be programs for performing processes in parallel or performing a process when necessary, such as when there is a call.

It should be noted that embodiments of the present technique are not limited to the above described embodiments, and various modifications may be made to them without departing from the scope of the present technique.

For example, the present technique can be embodied in a cloud computing structure in which one function is shared among apparatuses via a network, and processing is performed by the apparatuses cooperating with one another.

The respective steps described with reference to the above described flowcharts can be carried out by one apparatus or can be shared among apparatuses.

In a case where more than one process is included in one step, the processes included in the step can be performed by one apparatus or can be shared among apparatuses.

The present technique can also be embodied in the following forms.
(1) An image processing device including:
a motion predicting unit that detects, from a criteria image and a reference image, a motion vector of each block in an image;
a motion compensating unit that generates a motion-compensated image by performing motion compensation on the reference image, using the motion vector;
a correction value calculating unit that calculates a correction value for correcting the pixel value of a current pixel in a current block in the motion-compensated image based on a boundary difference value between the criteria image and the motion-compensated image, the boundary difference value being a difference value with respect to the pixel value of a boundary pixel in a boundary portion adjacent to an adjacent block in the current block; and
an adding unit that adds the correction value to the pixel value of the current pixel in the motion-compensated image.
(2) The image processing device of (1), wherein the correction value calculating unit calculates the correction value for the current pixel based on the boundary difference value and a weight corresponding to a distance between the current pixel and the boundary pixel.

(3) The image processing device of (1) or (2), wherein the correction value calculating unit calculates the correction value for the current pixel based on the boundary difference value between the criteria image and the motion-compensated image, with respect to the boundary pixel from which a pixel in the boundary portion adjacent to the adjacent block in the current block is subtracted.

(4) The image processing device of any of (1) through (3), further including:

an approximating unit that approximates a difference value with a predetermined function, the difference value being a difference between the pixel value of a pixel in the criteria image and the pixel value of a pixel in the motion-compensated image on a block-by-block basis;

an integrating unit that integrates the predetermined function;

a weight calculating unit that calculates a weight coefficient in accordance with the value of the integral obtained by the integrating unit and a distribution of noise intensity corresponding to an image luminance value; and a weighting unit that weights the correction value for the current pixel by using the weight coefficient, wherein the adding unit adds the correction value weighted by the weighting unit to the pixel value of the current pixel in the motion-compensated image.

(5) The image processing device of any of (1) through (3), further including:

an approximating unit that approximates a difference value with a predetermined function, the difference value being the difference between the pixel value of a pixel in the criteria image and the pixel value of a pixel in the motion-compensated image on a block-by-block basis;

an integrating unit that integrates the predetermined function; and a combining unit that generates a combined image in accordance with the value of the integral obtained by the integrating unit and a distribution of noise intensity corresponding to an image luminance value, the combined image being formed by combining the pixel value of the pixel in the criteria image and the pixel value of the pixel in the motion-compensated image, wherein the correction value calculating unit calculates the correction value for the current pixel in the current block based on the boundary difference value between the combined image and the motion-compensated image, the boundary difference value being the difference value with respect to the pixel value of the boundary pixel in the boundary portion adjacent to the adjacent block in the current block.

(6) An image processing method implemented in an image processing device including:

a motion predicting unit that detects, from a criteria image and a reference image, a motion vector of each block in an image;

a motion compensating unit that generates a motion-compensated image by performing motion compensation on the reference image, using the motion vector;

a correction value calculating unit that calculates a correction value for correcting the pixel value of a current pixel in a current block in the motion-compensated image based on a boundary difference value between the criteria image and the motion-compensated image, the boundary difference value being a difference value with respect to the pixel value of a boundary pixel in a boundary portion adjacent to an adjacent block in the current block; and an adding unit that adds the correction value to the pixel value of the current pixel in the motion-compensated image, the image processing method including the steps of:

generating a motion-compensated image by detecting, from a criteria image and a reference image, a motion vector of each block in an image, and performing motion compensation on the reference image, using the motion vector;

calculating a correction value for correcting the pixel value of a current pixel in a current block in the motion-compensated image based on a boundary difference value between the criteria image and the motion-compensated image, the boundary difference value being a difference value with respect to the pixel value of a boundary pixel in a boundary portion adjacent to an adjacent block in the current block; and adding the correction value to the pixel value of the current pixel in the motion-compensated image, the steps being carried out by the image processing device.

(7) A program for causing a computer to perform a process including:

a motion vector detecting step of detecting, from a criteria image and a reference image, a motion vector of each block in an image;

a motion compensating step of generating a motion-compensated image by performing motion compensation on the reference image, using the motion vector;

a correction value calculating step of calculating a correction value for correcting the pixel value of a current pixel in a current block in the motion-compensated image based on a boundary difference value between the criteria image and the motion-compensated image, the boundary difference value being a difference value with respect to the pixel value of a boundary pixel in a boundary portion adjacent to an adjacent block in the current block; and an adding step of adding the correction value to the pixel value of the current pixel in the motion-compensated image.

(8) A recording medium having a program recorded therein, the program being for causing a computer to perform a process including:

a motion vector detecting step of detecting, from a criteria image and a reference image, a motion vector of each block in an image;

a motion compensating step of generating a motion-compensated image by performing motion compensation on the reference image, using the motion vector;

a correction value calculating step of calculating a correction value for correcting the pixel value of a current pixel in a current block in the motion-compensated image based on a boundary difference value between the criteria image and the motion-compensated image, the boundary difference value being a difference value with respect to the pixel value of a boundary pixel in a boundary portion adjacent to an adjacent block in the current block; and an adding step of adding the correction value to the pixel value of the current pixel in the motion-compensated image.

REFERENCE SIGNS LIST

11 Image processing device
31 Motion predicting unit
32 Motion compensating unit
33 Block noise correcting unit
52 Correction value calculating unit
53 Adding unit
131 Block noise detecting unit
132 Block noise correcting unit
151 Difference calculating unit
152 Approximating unit
153 Integrating unit 154 Combining unit
251 Weight calculating unit
252 Weighting unit

The invention claimed is:

1. An image processing device comprising:
processing circuitry including a processor and a memory encoded with instructions configured to:
detect, from a criteria image and a reference image, a motion vector of each block in an image;
generate a motion-compensated image by performing motion compensation on the reference image, using the motion vector;
calculate a correction value for correcting a pixel value of a current pixel in a current block in the motion-compensated image based on a boundary difference value between the criteria image and the motion-compensated image, the boundary difference value being a difference value that is determined with respect to a pixel value of a boundary pixel in a boundary portion adjacent to an adjacent block in the current block;
add the correction value to the pixel value of the current pixel in the motion-compensated image;
approximate a difference value with a predetermined function, the difference value being a difference between a pixel value of a pixel in the criteria image and a pixel value of a pixel in the motion-compensated image on a block-by-block basis;
integrate the predetermined function;
calculate a weight coefficient in accordance with a value of an integral obtained by integrating the predetermined function and a distribution of noise intensity corresponding to an image luminance value; and
weight the correction value for the current pixel by using the weight coefficient,
wherein the weighted correction value is added to the pixel value of the current pixel in the motion-compensated image.

2. The image processing device according to claim 1, wherein the processing circuitry is configured to calculate the correction value for the current pixel based on the boundary difference value and a weight corresponding to a distance between the current pixel and the boundary pixel.

3. The image processing device according to claim 1, wherein the processing circuitry is configured to calculate the correction value for the current pixel based on the boundary difference value between the criteria image and the motion-compensated image, with respect to the boundary pixel from which a pixel in the boundary portion adjacent to the adjacent block in the current block is subtracted.

4. An image processing device comprising:
processing circuitry including a processor and a memory encoded with instructions configured to:
detect, from a criteria image and a reference image, a motion vector of each block in an image;
generate a motion-compensated image by performing motion compensation on the reference image, using the motion vector;
calculate a correction value for correcting a pixel value of a current pixel in a current block in the motion-compensated image based on a boundary difference value between the criteria image and the motion-compensated image, the boundary difference value being a difference value that is determined with respect to a pixel value of a boundary pixel in a boundary portion adjacent to an adjacent block in the current block;
add the correction value to the pixel value of the current pixel in the motion-compensated image;
approximate a difference value with a predetermined function, the difference value being a difference between a pixel value of a pixel in the criteria image and a pixel value of a pixel in the motion-compensated image on a block-by-block basis;
integrate the predetermined function; and
generate a combined image in accordance with a value of an integral obtained by integrating the predetermined function and a distribution of noise intensity corresponding to an image luminance value, the combined image being formed by combining the pixel value of the pixel in the criteria image and the pixel value of the pixel in the motion-compensated image,
wherein the correction value for the current pixel in the current block is calculated based on the boundary difference value between the combined image and the motion-compensated image, the boundary difference value being the difference value that is determined with respect to the pixel value of the boundary pixel in the boundary portion adjacent to the adjacent block in the current block.

5. An image processing method implemented in an image processing device, the image processing method comprising:
generating a motion-compensated image by detecting, from a criteria image and a reference image, a motion vector of each block in an image, and performing motion compensation on the reference image, using the motion vector;
calculating a correction value for correcting a pixel value of a current pixel in a current block in the motion-compensated image based on a boundary difference value between the criteria image and the motion-compensated image, the boundary difference value being a difference value that is determined with respect to a pixel value of a boundary pixel in a boundary portion adjacent to an adjacent block in the current block;
adding the correction value to the pixel value of the current pixel in the motion-compensated image;
approximating a difference value with a predetermined function, the difference value being a difference between a pixel value of a pixel in the criteria image and a pixel value of a pixel in the motion-compensated image on a block-by-block basis;
integrating the predetermined function;
calculating a weight coefficient in accordance with a value of an integral obtained by integrating the predetermined function and a distribution of noise intensity corresponding to an image luminance value; and
weighting the correction value for the current pixel by using the weight coefficient,
wherein the weighted correction value is added to the pixel value of the current pixel in the motion-compensated image.

6. A non-transitory computer-readable storage device encoded with computer-readable instructions that, when executed by processing circuitry, perform a process including:
detecting, from a criteria image and a reference image, a motion vector of each block in an image;

generating a motion-compensated image by performing motion compensation on the reference image, using the motion vector;

calculating a correction value for correcting a pixel value of a current pixel in a current block in the motion-compensated image based on a boundary difference value between the criteria image and the motion-compensated image, the boundary difference value being a difference value that is determined with respect to a pixel value of a boundary pixel in a boundary portion adjacent to an adjacent block in the current block;

adding the correction value to the pixel value of the current pixel in the motion-compensated image;

approximating a difference value with a predetermined function, the difference value being a difference between a pixel value of a pixel in the criteria image and a pixel value of a pixel in the motion-compensated image on a block-by-block basis;

integrating the predetermined function;

calculating a weight coefficient in accordance with a value of an integral obtained by integrating the predetermined function and a distribution of noise intensity corresponding to an image luminance value; and weighting the correction value for the current pixel by using the weight coefficient, wherein the weighted correction value is added to the pixel value of the current pixel in the motion-compensated image.

* * * * *